(12) United States Patent
Ishimasa et al.

(10) Patent No.: US 12,443,002 B2
(45) Date of Patent: Oct. 14, 2025

(54) OPTICAL APPARATUS, IMAGE STABILIZATION DEVICE, LENS BARREL, AND IMAGE PICKUP APPARATUS

(71) Applicant: CANON KABUSHIKI KAISHA, Tokyo (JP)

(72) Inventors: Toru Ishimasa, Kanagawa (JP); Kohei Uemura, Tokyo (JP); Masato Shiono, Kanagawa (JP); Kohei Uemura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 17/883,730

(22) Filed: Aug. 9, 2022

(65) Prior Publication Data
US 2023/0055253 A1    Feb. 23, 2023

(30) Foreign Application Priority Data

Aug. 23, 2021  (JP) .................................. 2021-135594

(51) Int. Cl.
*G02B 7/02* (2021.01)
*G02B 27/64* (2006.01)

(52) U.S. Cl.
CPC ........... *G02B 7/021* (2013.01); *G02B 27/646* (2013.01)

(58) Field of Classification Search
CPC ...... G02B 7/021; G02B 27/646; G02B 7/102; G02B 7/023; G03B 2205/0015; G03B 5/02; G03B 17/04

See application file for complete search history.

(56) References Cited

U.S. PATENT DOCUMENTS

| 2004/0151490 A1* | 8/2004 | Nomura | G02B 7/102 |
| | | | 396/349 |
| 2005/0105193 A1* | 5/2005 | Kawanabe | G02B 7/023 |
| | | | 359/694 |

(Continued)

FOREIGN PATENT DOCUMENTS

| JP | 11231201 A | 8/1999 |
| JP | 2011154201 A | 8/1999 |

(Continued)

OTHER PUBLICATIONS

The above foreign patent documents were cited in the Mar. 18, 2025 Japanese Office Action, which is enclosed without an English Translation, that issued in Japanese Patent Application No. 2021-135594.

*Primary Examiner* — Pinping Sun
*Assistant Examiner* — Matthew Y Lee
(74) *Attorney, Agent, or Firm* — Cowan, Liebowitz & Latman, P.C.

(57) ABSTRACT

An optical apparatus capable of adjusting a position of a lens with a simple configuration that enables miniaturization without deteriorating optical performance. Lens groups are arranged on an optical axis to be movable along the optical axis. A first shaft is arranged in parallel to the optical axis and has a fitting part fit in a predetermined lens group and a first fixing part. A support member rotatably supports the first shaft by holding the first fixing part. A center axis of the first fixing part and a center axis of the fitting part are eccentric. The first shaft is supported by the support member to be rotatable around the center axis of the first fixing part. The predetermined lens group is movable between an image pickup position on the optical axis and a retreat position that is separated from the optical axis by rotating around the first shaft.

9 Claims, 42 Drawing Sheets

(56) References Cited

U.S. PATENT DOCUMENTS

| | | | | |
|---|---|---|---|---|
| 2009/0207509 A1* | 8/2009 | Nomura | ................ | G02B 7/102 |
| | | | | 359/813 |
| 2017/0205602 A1* | 7/2017 | Kudoh | ................ | G02B 7/023 |

FOREIGN PATENT DOCUMENTS

| | | | | |
|---|---|---|---|---|
| JP | 2004-233919 | A | | 8/2004 |
| JP | 2005128250 | A | * | 5/2005 |
| JP | 2006-171079 | A | | 6/2006 |
| JP | 2006235297 | A | * | 9/2006 |
| JP | 2007-033961 | A | | 2/2007 |
| JP | 2008209647 | A | | 9/2008 |
| JP | 2012141401 | A | * | 7/2012 |
| JP | 2015-021993 | A | | 2/2015 |
| JP | 2016151647 | A | | 8/2016 |

* cited by examiner

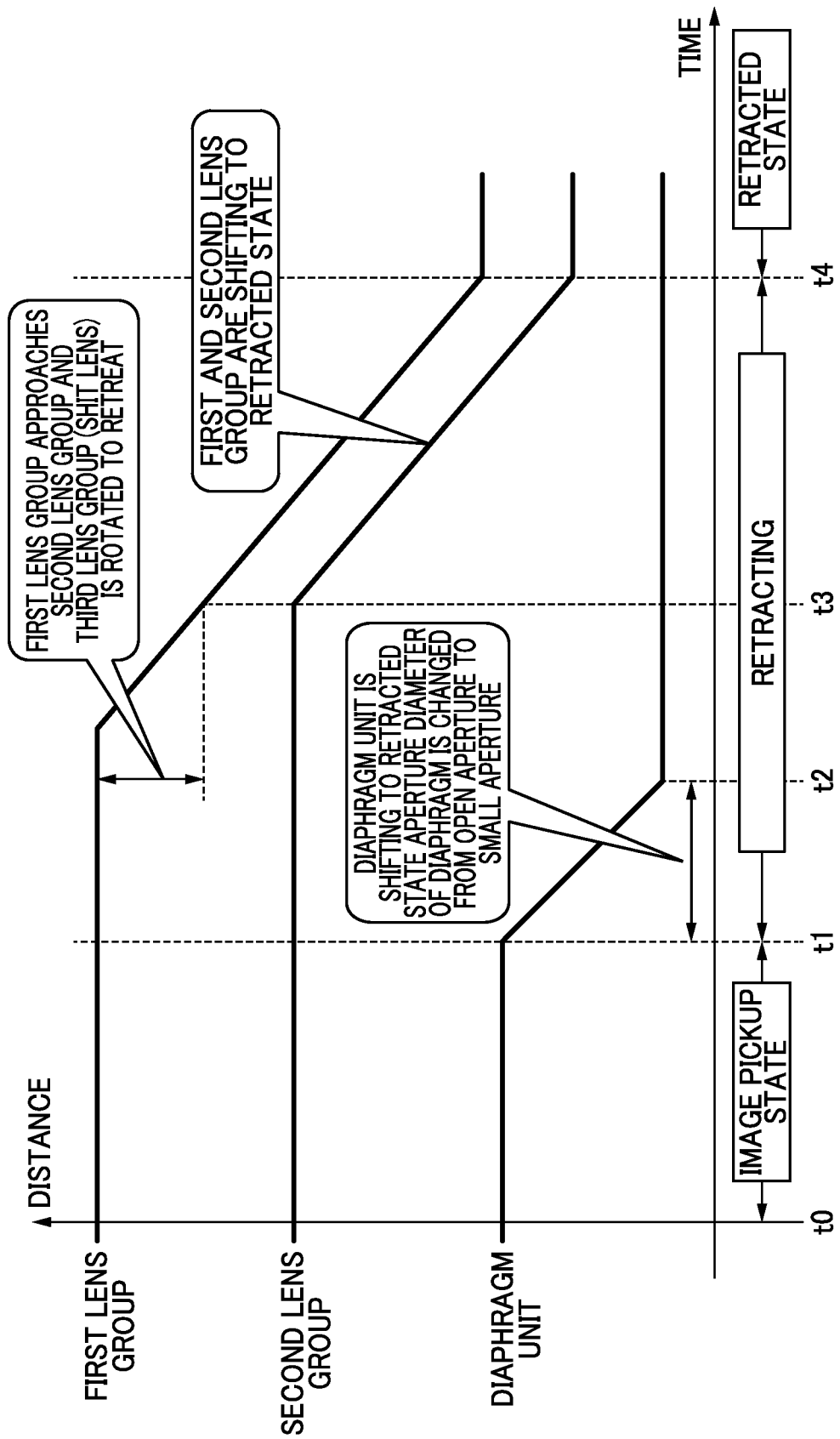

OPTICAL APPARATUS, IMAGE STABILIZATION DEVICE, LENS BARREL, AND IMAGE PICKUP APPARATUS

BACKGROUND OF THE INVENTION

Field of the Invention

The present invention relates to an optical apparatus, an image stabilization device, a lens barrel, and an image pickup apparatus.

Description of the Related Art

Optical apparatuses, such as a digital camera, a video camera, and an interchangeable lens (a lens barrel), are required to improve portability in unused time in recent years. A retraction mechanism that shortens distances between lenses in an optical axis direction is known as one of techniques that miniaturize an optical apparatus in unused time. Moreover, a lens retreat mechanism that shortens an overall length due to retreat of a part of lens groups in a direction (radial direction) that intersects perpendicularly with an optical axis is known as another technique.

For example, Japanese Laid-Open Patent Publication (Kokai) No. 2004-233919 (JP 2004-233919A) discloses an image pickup apparatus that accurately drives a retreatable lens group, which is rotatable around an axis parallel to an optical axis between an image pickup position on the optical axis and a retreat position outside the optical axis, and that enables easy position adjustment. Japanese Laid-Open Patent Publication (Kokai) No. 2015-021993 (JP 2015-021993A) discloses an image pickup apparatus that provides a guide member that moves a movable member in a direction that intersects perpendicularly with an optical axis. This image pickup apparatus is miniaturized in unused time by retracting the movable member from the optical axis and by storing another member into a space that is occupied by the movable member in use time.

Japanese Laid-Open Patent Publication (Kokai) No. 2007-033961 (JP 2007-033961A) discloses a lens driving apparatus that moves at least one lens frame to a retreat position outside an optical axis from an image pickup position on the optical axis with a bending retreat mechanism in the retraction time. Japanese Laid-Open Patent Publication (Kokai.) No. 2006-171079 (JP 2006-171079A) discloses an interchangeable lens in which a retreatable lens barrel that hold a part of an optical system is arranged so as to be retreatable to a retreat position outside an optical axis and a light amount adjustment unit is arranged on the optical axis so as to be movable in an optical axis direction.

Since the technique disclosed in JP 2004-233919A mentioned above adjusts a drive unit of the retreatable lens group using three kinds of eccentric pins, long adjustment time is needed and the lens barrel is enlarged because a retreat mechanism becomes complicated. The technique disclosed in JP 2015-021993A mentioned above does not regulates the movable member in an optical axis direction in the retreat position. Accordingly, when a heavy large lens in the retreat position receives impact from the outside, for example, positional accuracy of the lens after returning to a use position may decrease, which may lower optical performance. As disclosed in JP 2007-033961A and JP 2006-171079A, when the lens is rotated around the axis that intersects perpendicularly with the optical axis from a position on the optical axis to the retreat position, an outer diameter of the lens barrel tends to increase when intending to prevent incidence of unnecessary light to an image sensor in image pickup time, which enlarges the lens barrel.

SUMMARY OF THE INVENTION

The present invention provides an optical apparatus that is capable of adjusting a position of a predetermined lens with a simple configuration that enables miniaturization without deteriorating optical performance.

Accordingly, a first aspect of the present invention provides an optical apparatus including lens groups that are arranged on an optical axis to be movable along the optical axis, a first shaft that is arranged in parallel to the optical axis and that has a fitting part fit in a predetermined lens group among the lens groups and a first fixing part, and a support member that rotatably supports the first shaft by holding the first fixing part, wherein a center axis of the first fixing part and a center axis of the fitting part are eccentric, wherein the first shaft is supported by the support member to be rotatable around the center axis of the first fixing part, and wherein the predetermined lens group is movable between an image pickup position on the optical axis and a retreat position that is separated from the optical axis by rotating around the first shaft.

According to the present invention, the optical apparatus that is capable of adjusting a position of a predetermined lens with a simple configuration that enables miniaturization without deteriorating optical performance can be provided.

Further features of the present invention will become apparent from the following description of exemplary embodiments with reference to the attached drawings.

BRIEF DESCRIPTION OF THE DRAWINGS

FIG. 35 is a timing chart shows movements of lens groups and a diaphragm unit during the transition from the image-pickup state to the non-photographing state of the lens barrel in the fourth embodiment.

DESCRIPTION OF THE EMBODIMENTS

Figure 1A:
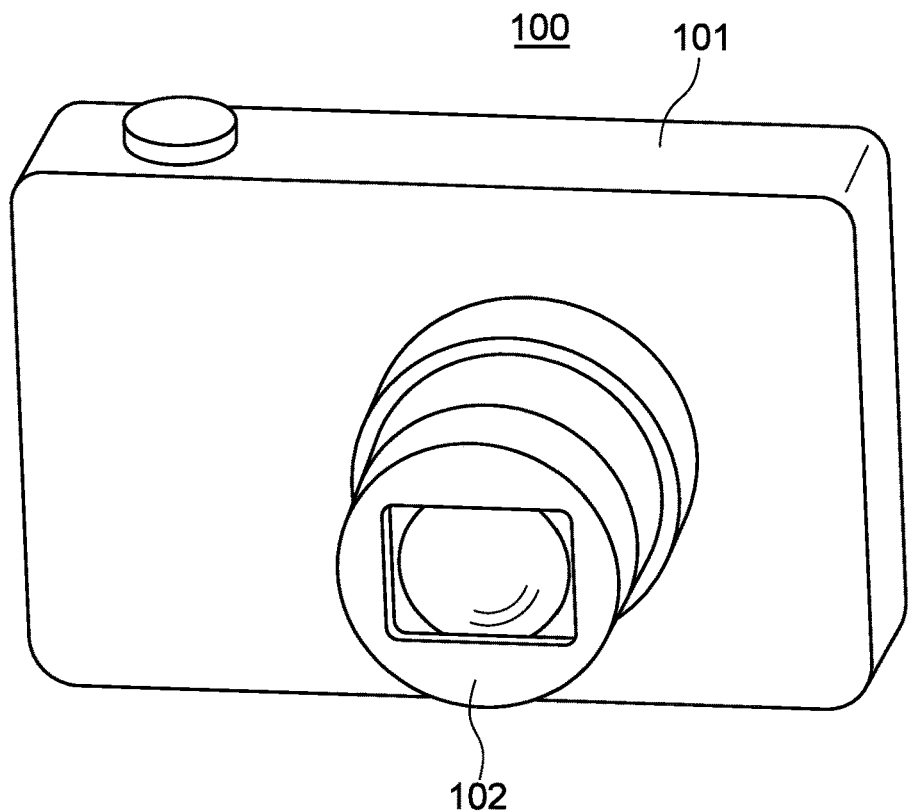
FIG. 1A and FIG. 1B are external perspective views respectively showing a digital camera according to a first embodiment and its lens barrel.

Hereafter, embodiments according to the present invention will be described in detail by referring to the drawings.

In each of the following embodiments, an image pickup apparatus, such as a digital camera or a digital video camera, is taken up as an optical apparatus according to the present invention. In particular, a lens barrel of the image pickup apparatus will be described mainly. It should be noted that a lens barrel may be an interchangeable lens that is detachable from a body of the image pickup apparatus or may not be detachable (i.e., may be constituted integrally with the body of the image pickup apparatus).

Figure 1B:
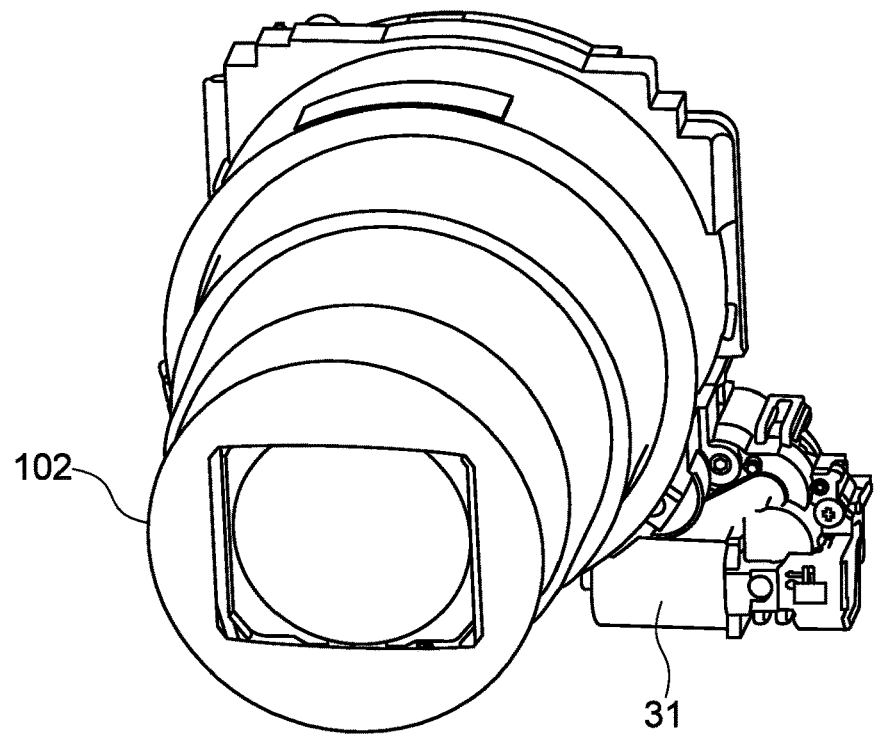

FIG. 1A is an external perspective view schematically showing a digital camera 100 according to a first embodiment. The digital camera 100 is provided with a camera body 101 and a retractable zoom lens barrel 102 (hereinafter referred to as a "lens barrel 102") arranged at a front side of the camera body 101. FIG. 1B is an external perspective view showing the lens barrel 102. The lens barrel 102 is provided with a zoom driver (zoom actuator) 31 that performs an extending action and an extracting action.

When a power source of the camera body 101 is turned ON, the extending action of the lens barrel 102 is performed and the lens barrel 102 varies from a retracted state (collapsed state) to an extended state. In the extended state, various kinds of lens groups that are included in the lens barrel 102 are arranged on an image-pickup optical axis (hereinafter, referred to as an "optical axis"), And, thereby, an image pickup operation by the digital camera 100 becomes available. Moreover, the lens barrel 102 is constituted so that an image pickup magnification is changed by controlling positions of the lens groups in an optical axis direction in the extended state. When the power source of the camera body 101 is turned OFF, the lens barrel 102 performs a retracting action and is changed from the extended state to the retracted state.

Figure 2:
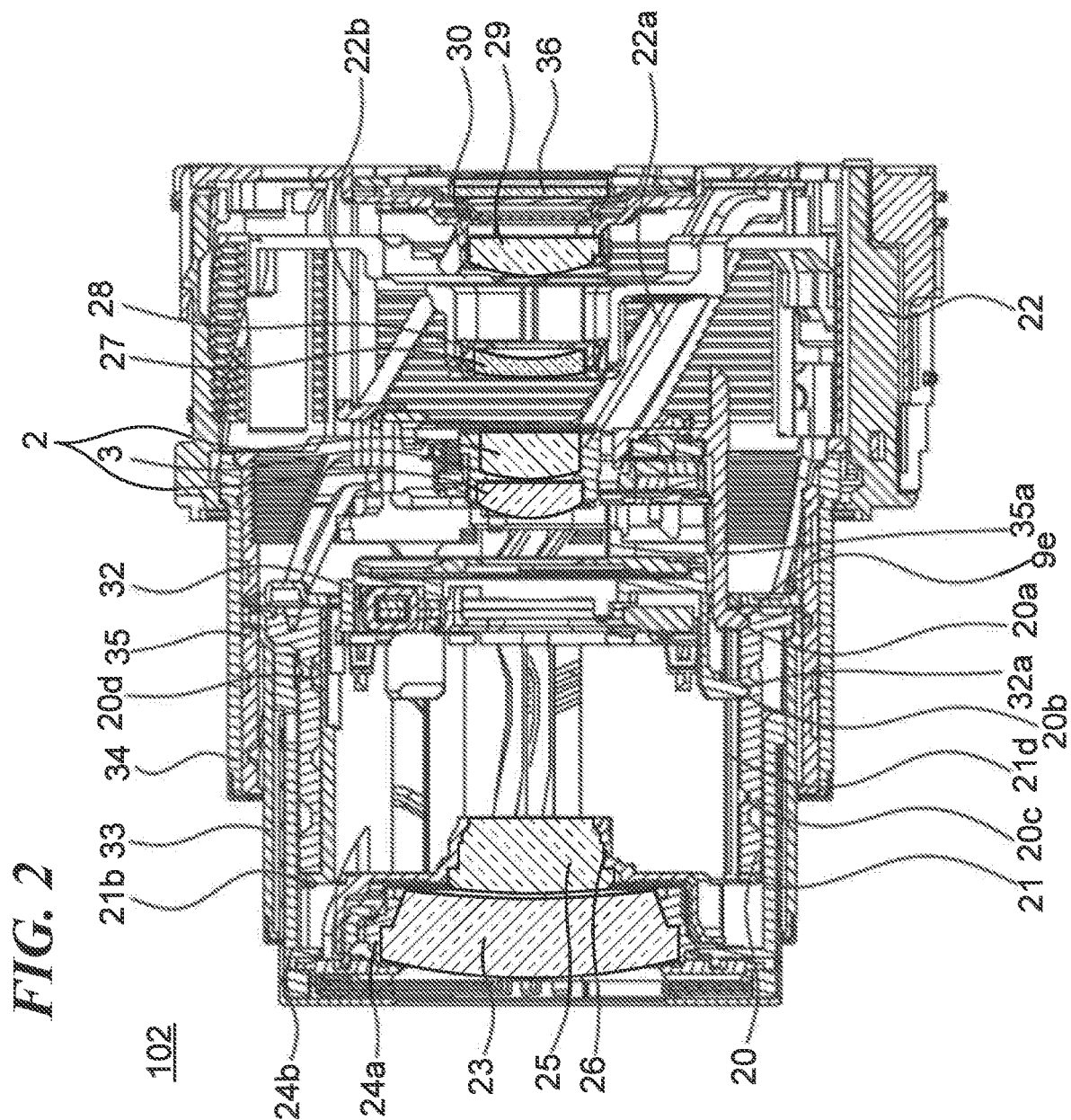
FIG. 2 is a sectional view showing an extended state of the lens barrel according to the first embodiment.
Figure 3:
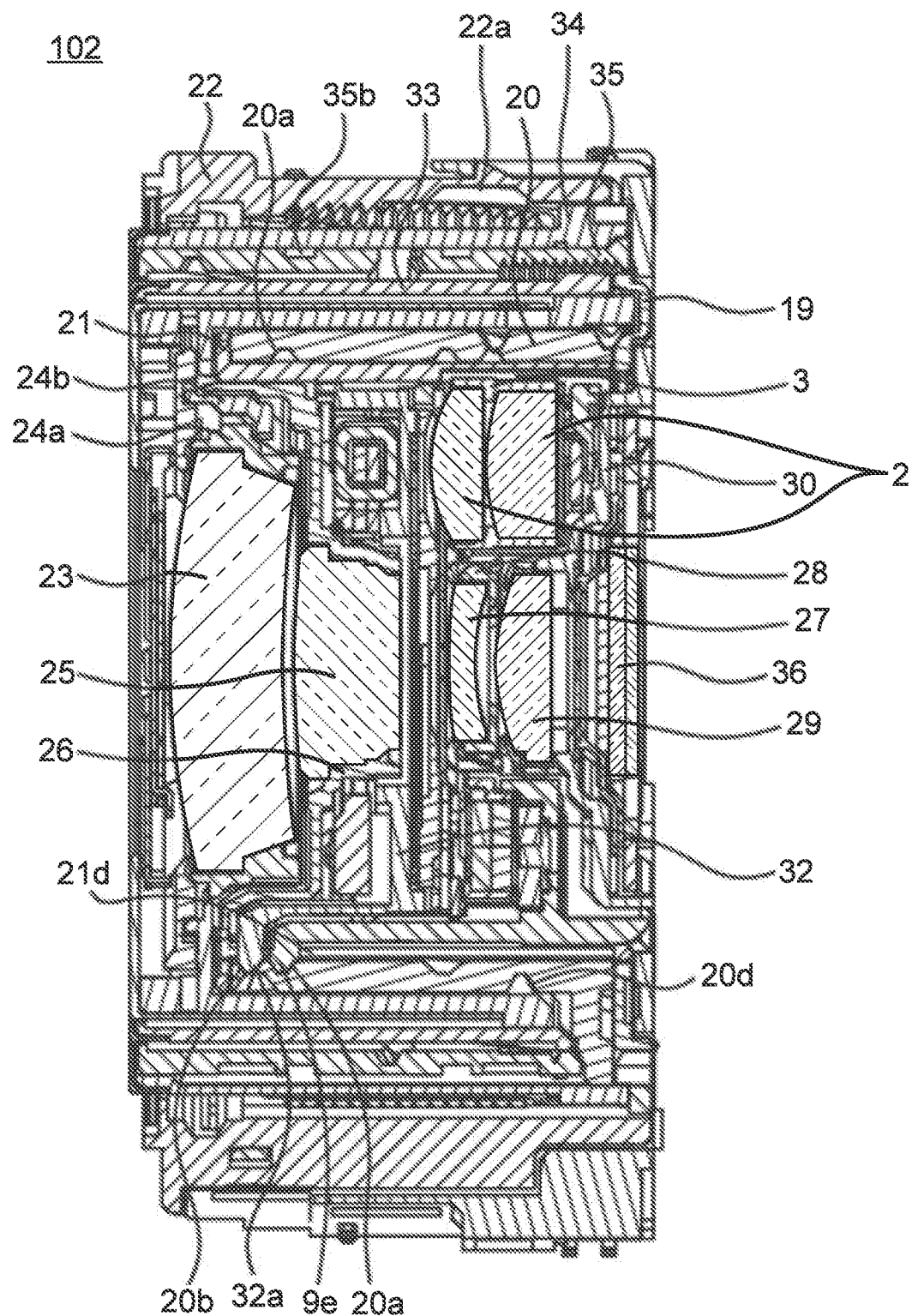
FIG. 3 is a sectional view showing a retracted state of the lens barrel according to the first embodiment.

FIG. 2 is a sectional view including the optical axis showing the lens barrel 102 in the extended state. FIG. 3 is a sectional view including the optical axis showing the lens barrel 102 in the retracted state. In FIG. 2 and FIG. 3, a left side is a side of an object (not shown) and a right side is a side of the camera body 101.

The lens barrel 102 is provided with a first lens group 23, a first group holder 24a holding the first lens group 23, a first group barrel 24b holding the first group holder 24a, a second lens group 25, and a second group holder 26 holding the second lens group 25. Moreover, the lens barrel 102 is provided with a third lens group 2, a third group holder 3 holding the third lens group 2, a fourth lens group 27, a fourth group holder 28 holding the fourth lens group 27, a fifth lens group 29, and a sensor holder 30 holding the fifth lens group 29.

The first lens group 23, first group holder 24a, and first group barrel 24b constitute a first group unit. The second lens group 25 and second group holder 26 constitute a second group unit. The third lens group 2 and third group holder 3 constitute a third group unit. The fourth lens group 27 and fourth group holder 28 constitute a fourth group unit. The fifth lens group 29 and sensor holder 30 constitute a fifth group unit. An image pickup optical system in the lens barrel 102 is constituted by the first lens group 23, second lens group 25, third lens group 2, fourth lens group 27, and fifth lens group 29.

A shutter unit 32 is arranged between the second group unit and third group unit. The shutter unit 32 adjusts an object light beam imaged onto an image sensor 36 by moving a pair of shutter blades (not shown) in a plane that intersects perpendicularly with the optical axis between positions where the blades block an optical path and positions where the blades retreat from the optical path. It should be noted that the shutter unit is provided in the camera body in a case where the image pickup apparatus is a digital single lens reflex camera of which a lens is interchangeable.

The sensor holder 30 supports a focus driver (not shown) and the zoom driver 31. A focusing operation is performed by moving the fourth group holder 28 holding the fourth lens group 27 in the optical axis direction with the focus driver. Moreover, a zoom operation is performed by moving the first, second, and third group units in the optical axis direction with the zoom actuator 31.

Hereinafter, a zoom mechanism will be described. A fixed barrel 22 is arranged at the outermost periphery of the lens barrel 102. Three cam grooves 22a are formed in an inner periphery of the fixed barrel 22 at nearly equal intervals in a circumferential direction. And three rectilinear key grooves 22b are formed in the inner periphery of the fixed barrel 22 at nearly equal intervals in the circumferential direction. Moreover, an outside cam barrel 34 is arranged inside the fixed barrel 22. Three followers (not shown) are formed on an outer periphery of the outside cam barrel 34 at nearly equal intervals in the circumferential direction. The three followers of the outside cam barrel 34 are respectively fit into the three cam grooves 22a of the fixed barrel 22 so as to be slidable. The zoom driver 31 rotates the outside cam barrel 34. When the outside cam barrel 34 is rotated by the zoom driver 31, the outside cam barrel 34 moves in the optical axis direction along lifts of the cam grooves 22a while rotating with respect to the fixed barrel 22.

An outside rectilinear barrel 35 is arranged inside the outside cam barrel 34. Rectilinear key grooves 35a are formed in an inner periphery of the outside rectilinear barrel 35, and circumference grooves 35b are formed in an outer periphery of the outside rectilinear barrel 35. Bayonet claws (not shown) that respectively engage with the circumference grooves 35b that are formed in the outer periphery of the outside rectilinear barrel 35 are formed in an inner periphery of the outside cam barrel 34 at predetermined intervals in the circumferential direction and optical axis direction. Moreover, rectilinear keys (not shown) that respectively engage with the rectilinear key grooves 22b of the fixed barrel 22 are formed in the outer periphery of the outside rectilinear barrel 35. Accordingly, the outside rectilinear barrel 35 linearly moves in the optical axis direction along the rectilinear key grooves 22b of the fixed barrel 22 with the rotation of the outside cam barrel 34.

An inside cam cover 33 is arranged inside the outside rectilinear barrel 35, and an inside cam barrel 20 is arranged inside the inside cam cover 33. Three cam grooves 20a, three shutter cam grooves 20b, and three second group cam grooves 20c are formed in an inner periphery of the inside cam barrel 20 at nearly equal intervals, respectively, in the circumferential direction. Three first group cam grooves 20d are formed in an outer periphery of the inside cam barrel 20 at nearly equal intervals in the circumferential direction.

Three followers, three inside-cam-cover engagement parts, and three drive keys (not shown) are formed in the outer periphery of the inside cam barrel 20 at nearly equal intervals, respectively, in the circumferential direction Three engagement claws (not shown) that respectively engage with the inside-cam-cover engagement parts of the inside cam barrel 20, and three detent parts (not shown) that are engaged with the drive keys of the inside cam barrel 20 are formed in the inside cam cover 33. Moreover, the drive keys provided in the outer periphery of the inside cam barrel 20 respectively engage with three key grooves (not shown) provided in the inner periphery of the outside cam barrel 34. Thereby, the inside cam barrel 20 rotates around the optical axis in the same phase as the outside cam barrel 34. As the inside cam barrel 20 rotates, the inside cam cover 33 moves in the optical axis direction while rotating around the optical axis integrally with the inside cam barrel 20.

The inside cam barrel 20 holds the rectilinear barrel 21 in the inner periphery so as to be relatively rotatable to the inside cam barrel 20. Rectilinear plates 19 are attached to the rectilinear barrel 21 integrally. Rectilinear keys (not shown) that engage with the rectilinear key grooves 35a provided in the inner periphery of the outside rectilinear barrel 35 are respectively formed in the rectilinear plates 19. Moreover, first group guide keys 21b, second group guide grooves (not shown), and third group guide grooves 21d are formed in the rectilinear barrel 21. Furthermore, a retreat introduction surface (not shown) that can contact a third group lever 6 (see FIG. 4A and FIG. 4B), a retreat completion surface (not shown) that can contact the third group lever 6, and a flange (not shown) are formed in the rectilinear barrel 21. The rectilinear barrel 21 is held by the flange and the rectilinear plates 19 of the rectilinear barrel 21 so as to be rotatable and can move integrally together with the inside cam barrel 20 in the optical axis direction.

First group followers (not shown) are provided at six positions in an inner periphery of the first group barrel 24b at nearly equal intervals in the circumferential direction. The first group holder 24a and first group barrel 24b move integrally in the optical axis direction by respectively engaging the first group followers at the six positions with the first group cam grooves 20d formed at six positions in the outer periphery of the inside cam barrel 20 so as to be slidable and by being guided by the first group guide keys 21b of the rectilinear barrel 21.

Second group followers (not shown) are provided at three positions in an outer periphery of the second group holder 26 at nearly equal intervals in the circumferential direction. The second group holder 26 is supported so as to be movable in the optical axis direction by respectively engaging the second group followers at the three positions with the second group cam grooves 20c provided at three positions in the inner periphery of the inside cam barrel 20 so as to be slidable and by being guided by the second group guide grooves (not shown) of the rectilinear barrel 21.

Shutter followers 32a are provided at three positions in an outer periphery of the shutter unit 32 at nearly equal intervals in the circumferential direction. The shutter unit 32 is supported so as to be movable in the optical axis direction by respectively engaging the shutter followers 32a at the three positions with the shutter cam grooves 20b provided at three positions in the inner periphery of the inside cam barrel 20 so as to be slidable and by being guided by the third group guide grooves 21d of the rectilinear barrel 21.

Figure 4A:
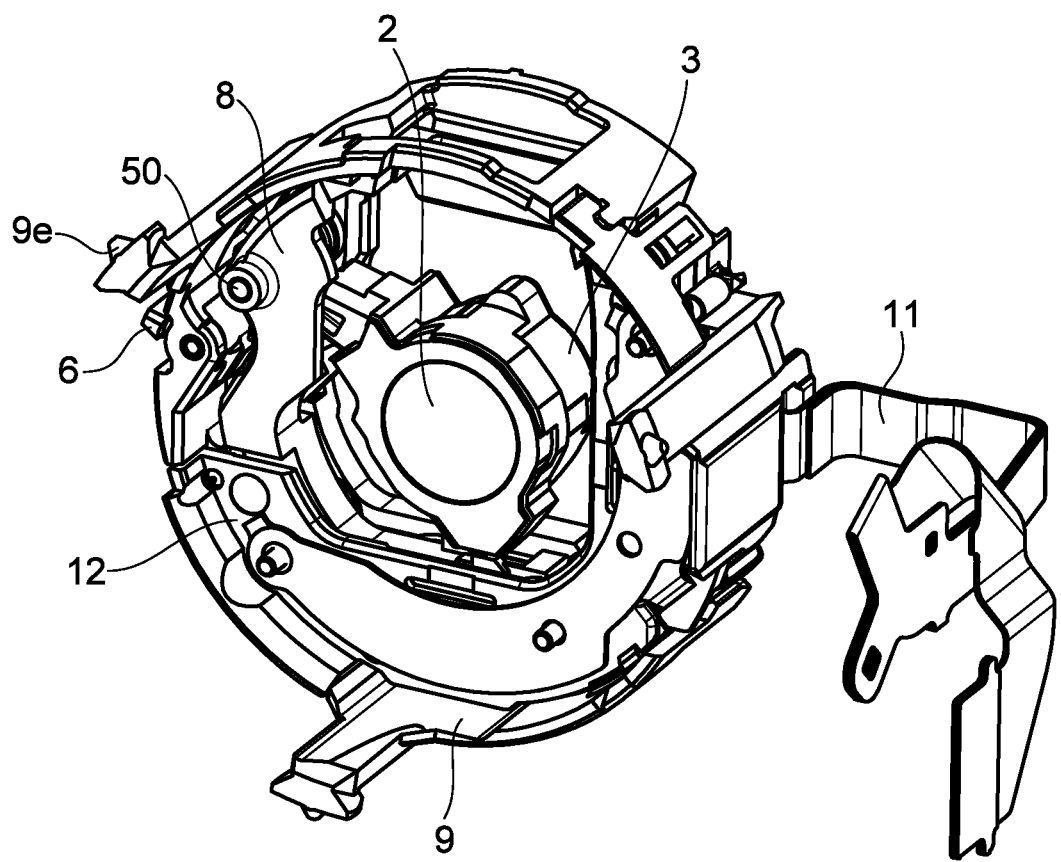
FIG. 4A and FIG. 4B are perspective views showing an image stabilization device provided in the lens barrel according to the first embodiment.
Figure 4B:
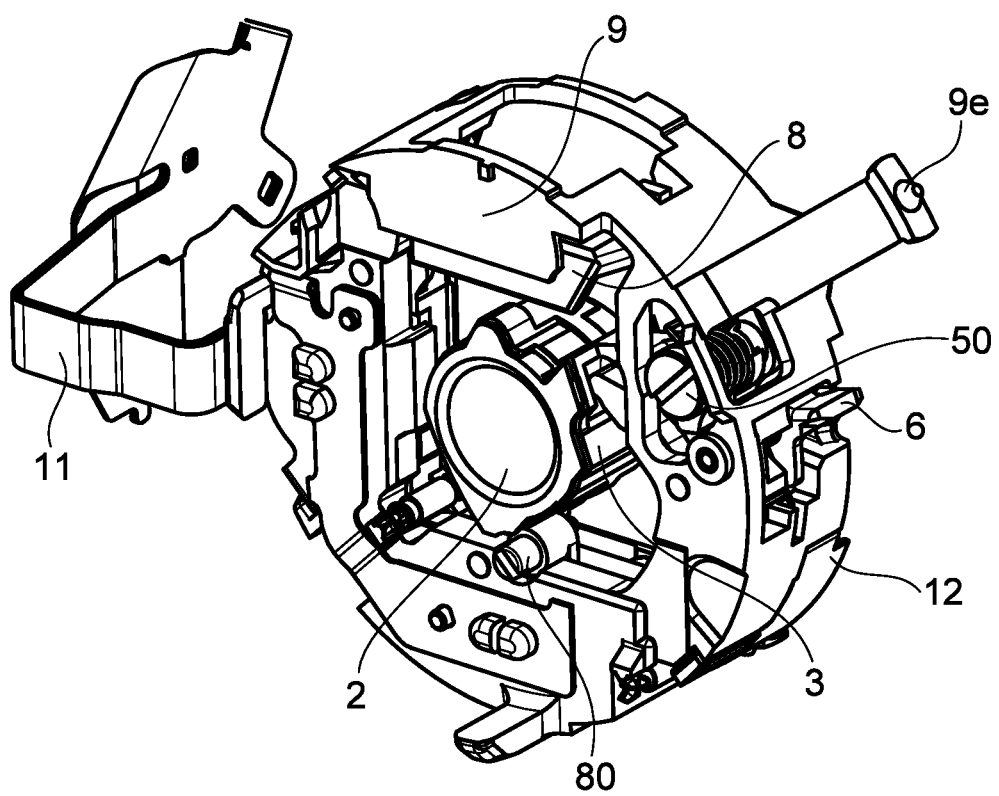

Next, the image stabilization device built in the lens barrel 102 will be described. FIG. 4A is a perspective view viewed from a front side (an object side) showing the image stabilization device that is provided in the lens barrel 102. FIG. 4B is a perspective view viewed from a back side (a side of the image sensor 36) showing the image stabilization device. The image stabilization device has the third lens group 2, the third group holder 3, a holder torsion spring 4, a holder shaft 50, a contact shaft 80, the third group lever 6, a third group frame 8, and a third group base plate 9.

A third group flexible substrate 11 is held by a Hall sensor holder 12, and the Hall sensor holder 12 is fixed to the third group base plate 9. A pair of Hall elements (not shown) are implemented in the third group flexible substrate 11. The pair of Hall elements are arranged in the positions that face a pair of magnets 8d (see FIG. 7A and FIG. 7B) in the optical axis direction to detect changes in directions and magnitudes of the magnetic forces of the pair of magnets 8d. A camera controller 232 (FIG. 14) provided in the camera body 101 finds a position of the third group frame 8 with respect to the Hall sensor holder 12 on the basis of the directions and magnitudes of the magnetic forces that are detected by e Hall elements.

Figure 5A:
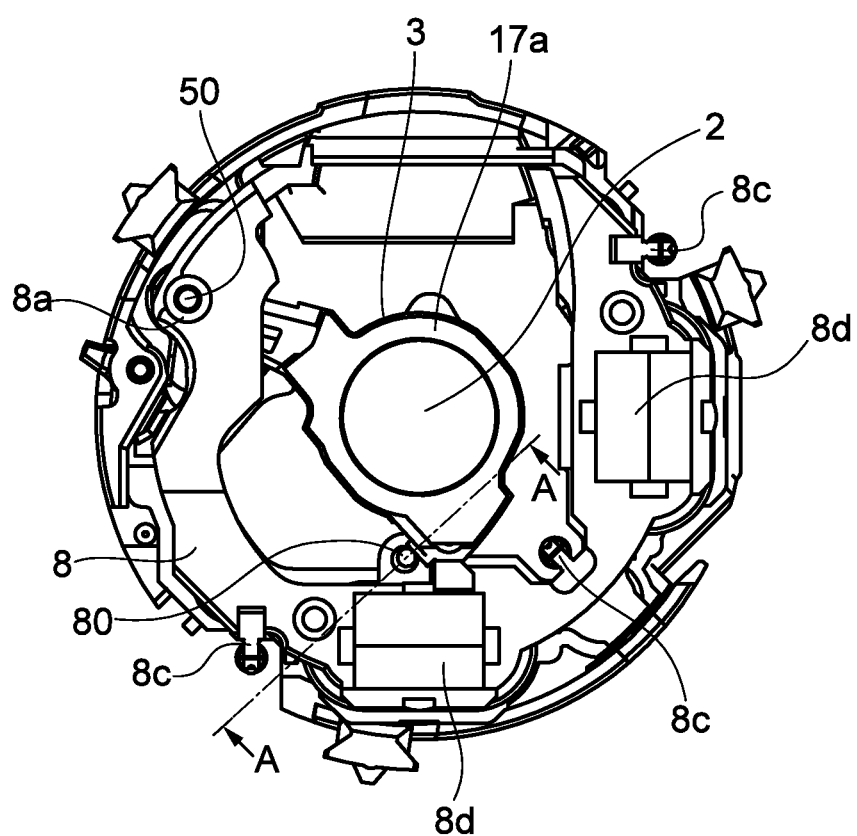
FIG. 5A and FIG. 5B are front views showing the configuration of the image stabilization device in the first embodiment.
Figure 5B:
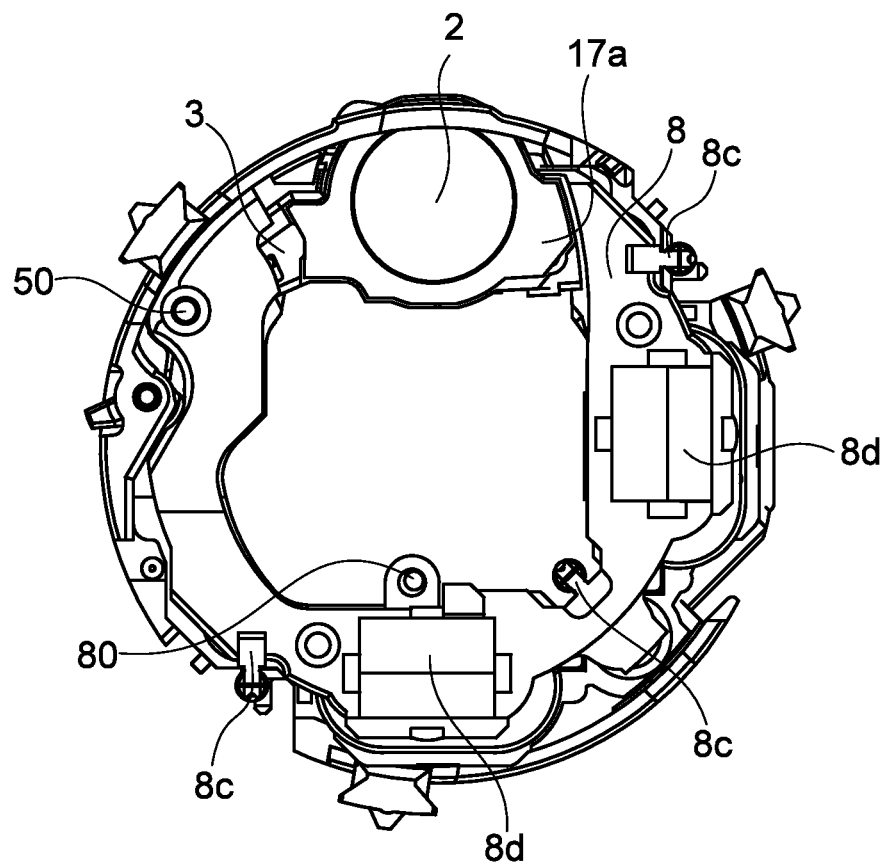
Figure 6:
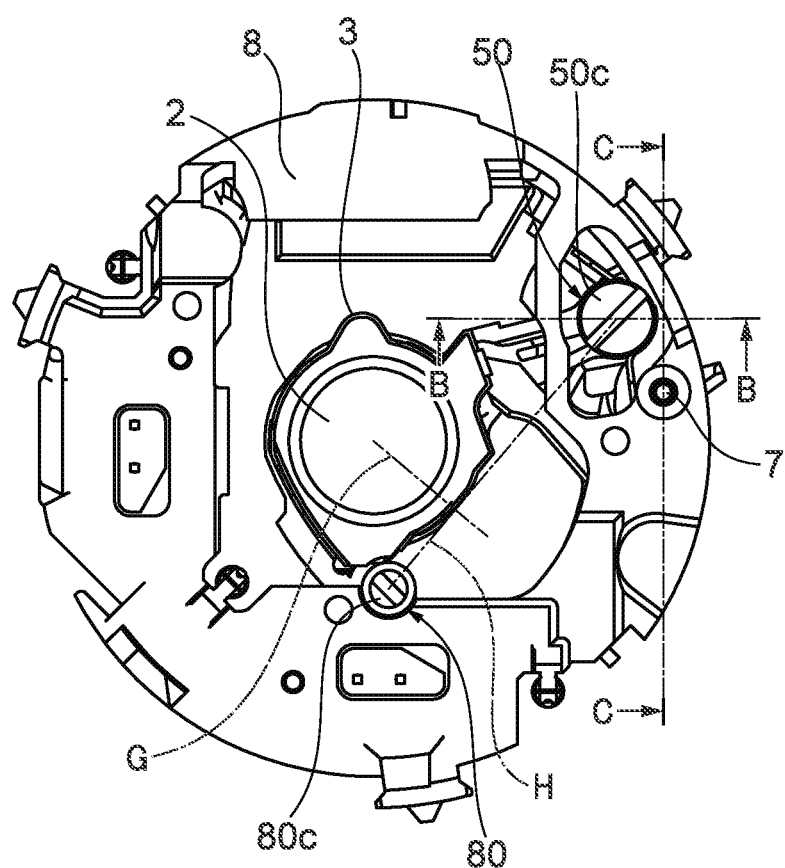
FIG. 6 is a back view showing the configuration of the image stabilization device in the first embodiment.

FIG. 5A is a front view (viewed from the object side) showing the image stabilization device in a case where the lens barrel 102 is in an extended state. FIG. 5B is a front view showing the image stabilization device in a case where the lens barrel 102 is in a retracted state. FIG. 6 is a back view showing the image stabilization device in the case where the lens barrel 102 is in the extended state.

The third group holder 3 holds the third lens group 2. The third lens group 2 is a retreatable lens group that is located in a position (henceforth an "image pickup position") on an optical axis when the lens barrel 102 is in the extended state and is located in a position (henceforth a "retreat position") away from the optical axis when the lens barrel 102 is in the retracted state. As shown in FIG. 3, the overall length of the lens barrel 102 in the retracted state can be shortened because the distance between the second lens group 25 and fourth lens group 27 in the optical axis direction can be shortened by moving the third lens group 2 to the retreat position when the lens barrel 102 is retracted.

In the description about this embodiment, for convenience, when the third lens group 2 is in the image pickup position, the third group holder 3 is expressed as being in the image pickup position, and when the third lens group 2 is in the retreat position, the third group holder 3 is expressed as being in the retreat position.

The third group holder 3 is provided with a third group mask 17a at the object side and a third group mask 17b (see FIG. 7B) at an image plane side. Spring hooks 8c to which one-side ends of thrust springs 14 (see FIG. 7A and FIG. 7B) are hooked are formed in three positions of the third group frame 8. Moreover, a bearing 8a that supports the holder shaft 50 (first shaft) is provided in the third group frame 8. The third group frame 8 is a support member that supports the third group holder 3 rotatably, and, specifically, the third group holder 3 is supported by the bearing 8a provided in the third group frame 8 so as to be rotatable around the holder shaft 50. The third group holder 3 is arranged so as to be movable within a plane that intersects perpendicularly with the optical axis between the image pickup position and the retreat position around the holder shaft 50 integrally with the third lens group 2.

Figure 7A:
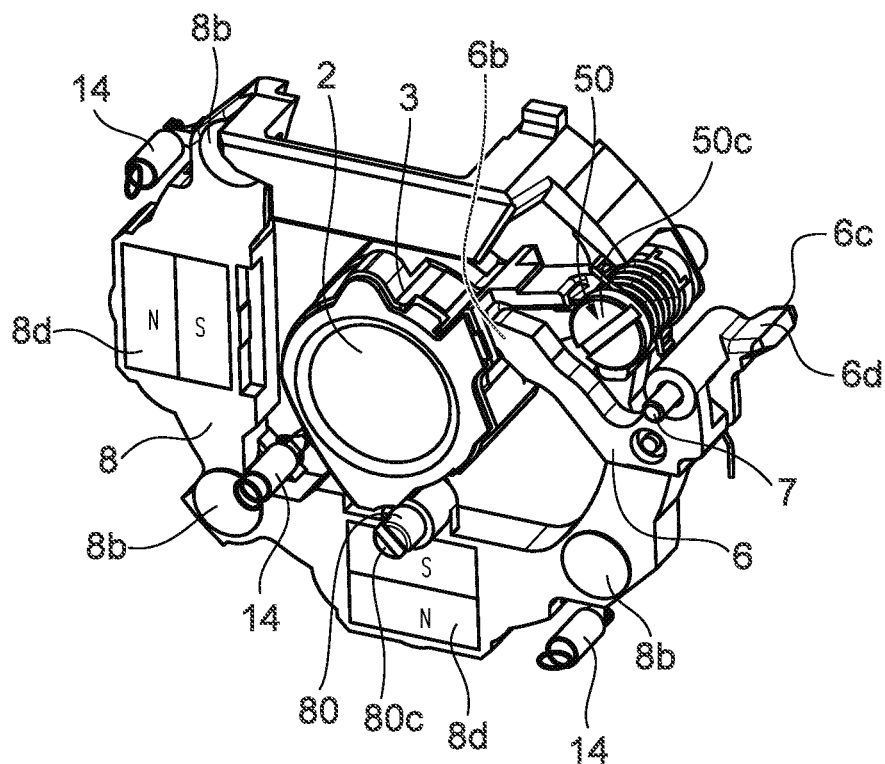
FIG. 7A and FIG. 7B are perspective views showing states of a third group holder that constitutes the image stabilization device in the first embodiment in an image pickup position and a retreat position, respectively.
Figure 7B:
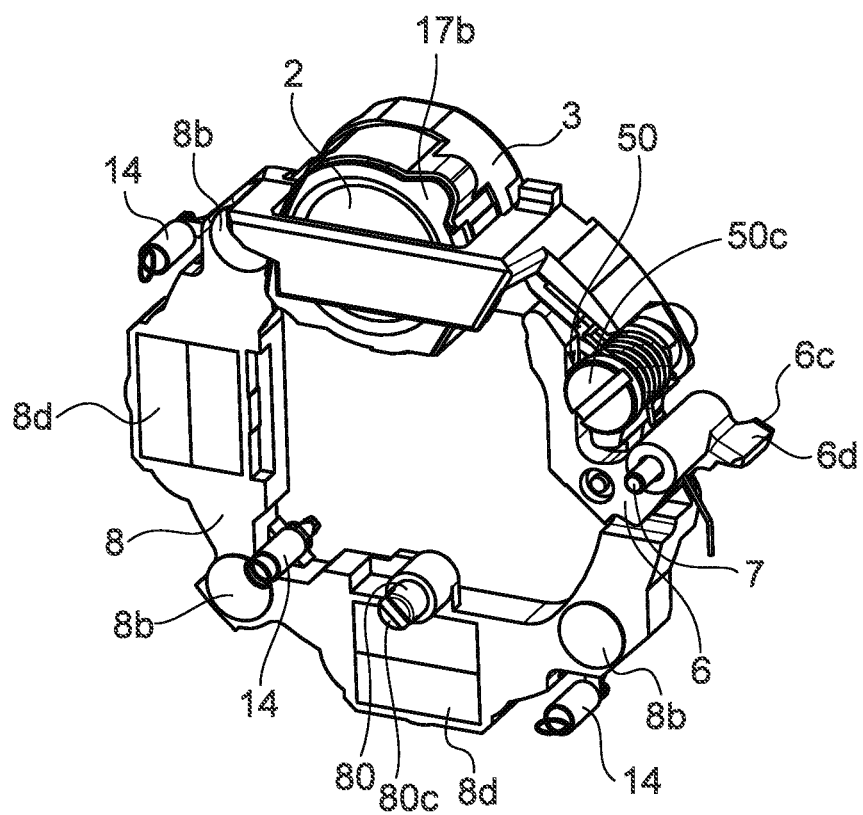

FIG. 7A is a perspective view viewed from the back side showing a positional relationship among the third group holder 3, the third group frame 8, and the third group lever 6 in the state where the third group holder 3 is in the image pickup position. FIG. 7B is a perspective view viewed from the back side showing a positional relationship among the third group holder 3, the third group frame 8, and the third group lever 6 in the state where the third group holder 3 is in the retreat position.

The one-side ends of the thrust springs 14 are respectively hooked on the spring hooks 8c formed in the three positions of the third group frame 8. Three ball receiving surfaces 8b that respectively contact three balls 13 (see FIG. 8) are formed in the third group frame 8. Moreover, the pair of magnets 8d are attached to the third group frame 8 in positions mutually separated about 90 degrees in the circumferential direction within a plane that intersects perpendicularly with the optical axis.

Figure 8:
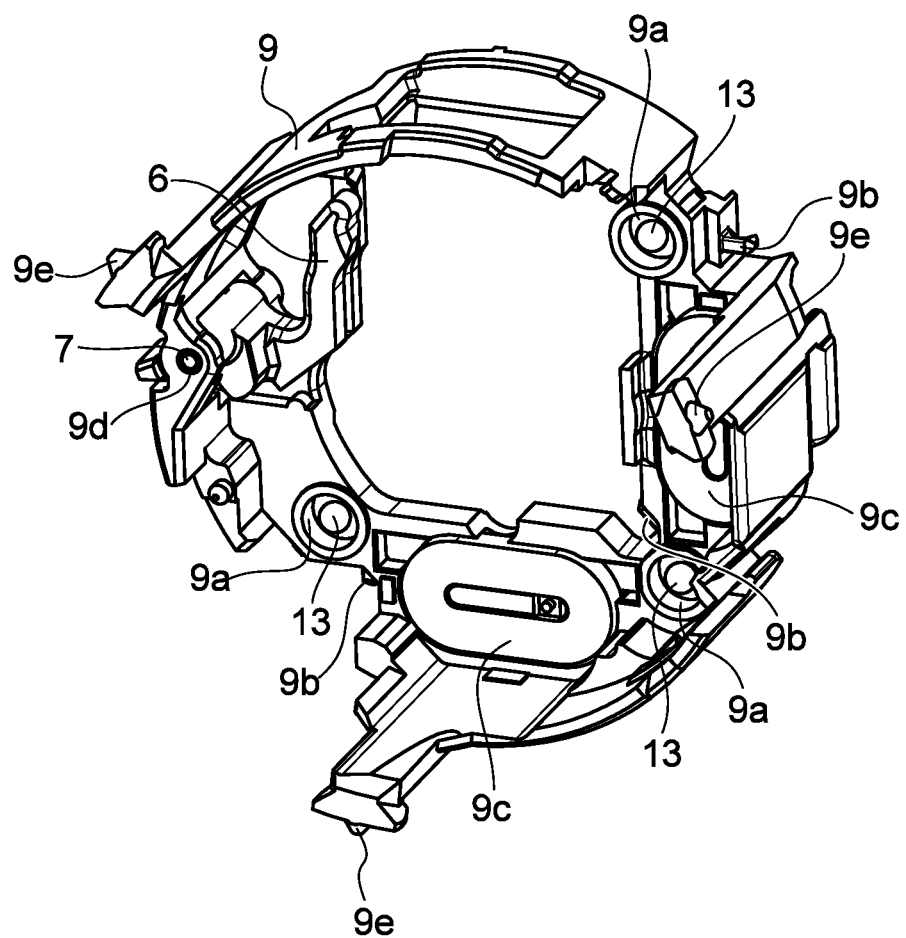
FIG. 8 is a perspective view showing a relationship between a third group base plate and a third group lever that constitute the image stabilization device in the first embodiment.
Figure 9:
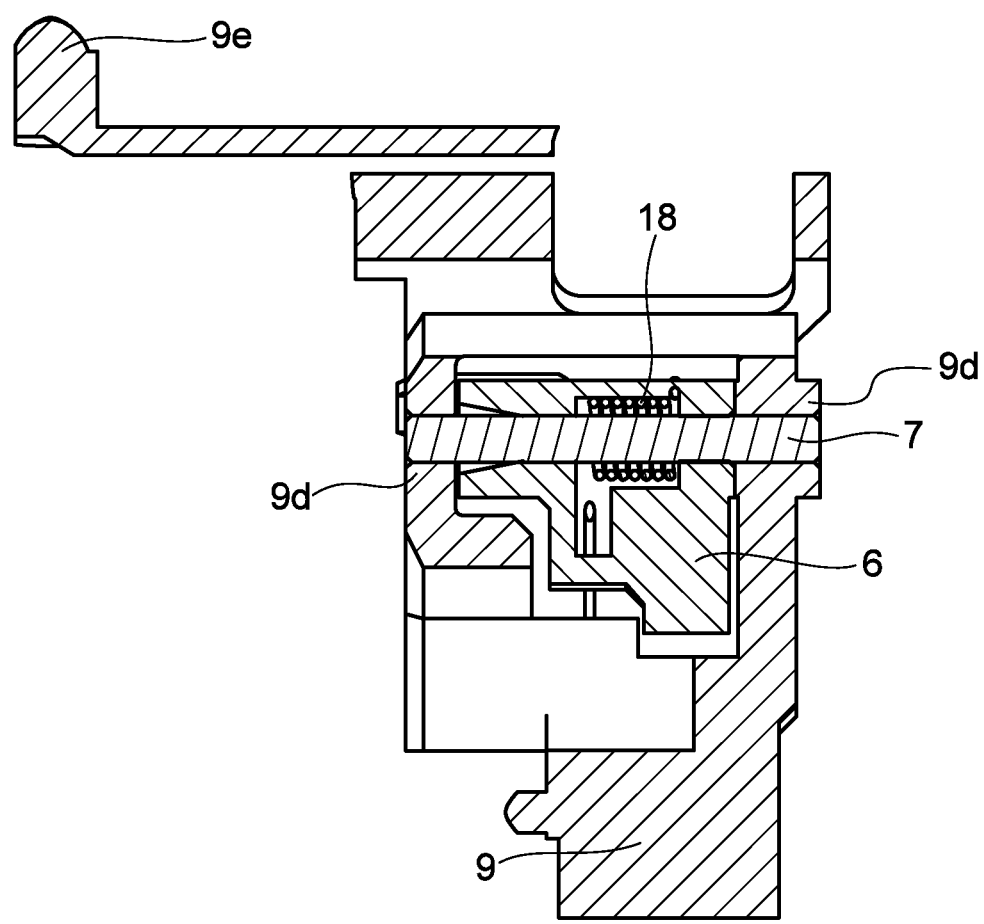
FIG. 9 is a sectional view showing the image stabilization device taken along a line C-C shown in FIG. 6.

FIG. 8 is a perspective view viewed from the front side showing a positional relationship between the third group base plate 9 and the third group lever 6. The third group holder 3 (not shown) is in the retreat position. FIG. 9 is a sectional view showing the third group frame 8 taken along a line C-C in FIG. 6, Ball holes 9a are formed in three positions of the third group base plate 9, and the balls 13 (rolling members) are arranged in the respective ball holes 9a. Spring hooks 9b to which the other ends of the three thrust springs 14 are respectively hooked are provided in three positions of the third group base plate 9, The three balls 13 can roll in the ball holes 9a within a plane that intersects perpendicularly with the optical axis in a state where the balls 13a are nipped between the ball receiving surfaces 8b of the third group frame 8 and the ball holes 9a of the third group base plate 9 by the energization forces of the thrust springs 14.

In the third group base plate 9, a third group lever shaft 7, a bearing 9d that supports the third group lever shaft 7, followers 9e that are slidably engaged with the cam grooves 20a (see FIG. 2 and FIG. 3) of the inside cam barrel 20 are provided. Moreover, a pair of coils 9c are arranged in the third group base plate 9 in the same phase as the pair of magnets 8d. When an electric current is supplied to the pair of coils 9c, Lorentz forces will generate between the coils 9c and the magnetisms of the magnets 8d. The Lorentz forces move the third group frame 8 with respect to the third group base plate 9 in a plane that intersects perpendicularly with the optical axis. In that time, since the third group holder 3 is supported by the third group frame 8 rotatably, the third group holder 3 moves integrally with the third group frame 8. That is, the third lens group 2 held by the third group holder 3 is movable integrally with the third group frame 8.

A retreat inclined surface 6c that contacts the retreat introduction surface (not shown) of the rectilinear barrel 21 and a retreat completion part 6d that contacts the retreat completion surface (not shown) of the rectilinear barrel 21 are provided in the third group lever 6. The third group lever 6 is supported by the bearing 9d of the third group base plate 9 so as to be rotatable around the third group lever shaft 7, The third group lever 6 is energized by a lever torsion spring 18 attached around the third group lever shaft 7 so as to contact an image-pickup-position contact surface (not shown) provided in the third group base plate 9 in the direction toward the image pickup position.

Figure 10:
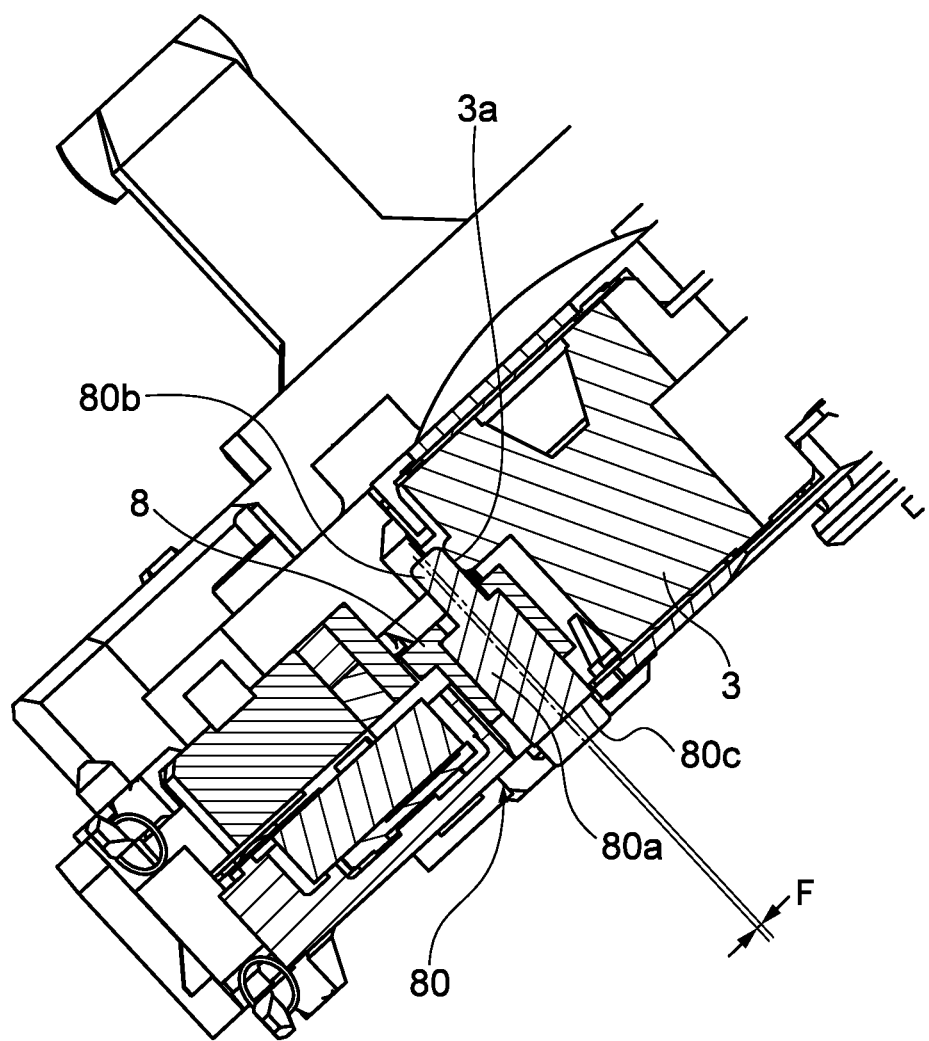
FIG. 10 is a sectional view showing the image stabilization device taken along a line A-A shown in FIG. 5A.

FIG. 10 is a sectional view showing the third group frame 8 taken along a line A-A shown in FIG. 5A. A stopper part 3a that regulates the position of the third group holder 3 in the optical axis direction is provided in the third group holder 3, and the stopper part 3a contacts the contact shaft 80 (a second axis).

Figure 11:
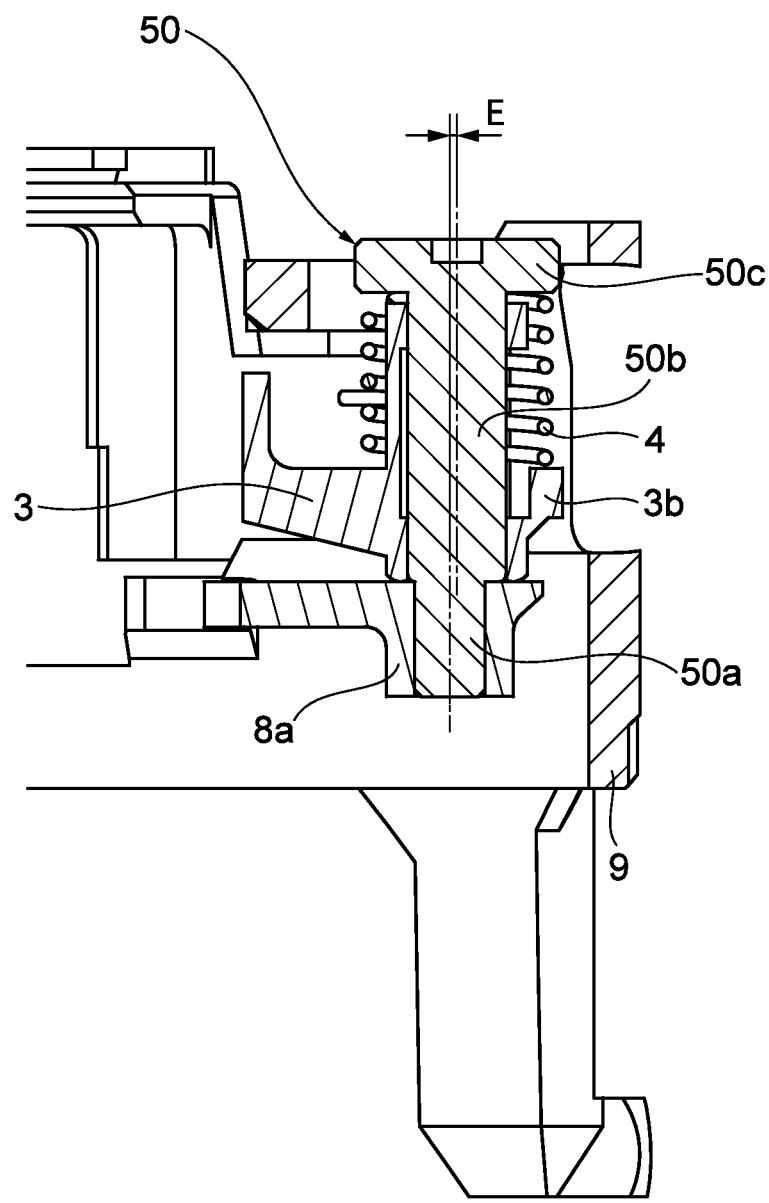
FIG. 11 is a sectional view showing the image stabilization device taken along a line B-B shown in FIG. 6.

FIG. 11 is a sectional view showing the third group frame 8 taken along a line B-B shown in FIG. 6. The holder torsion spring 4 consists of a torsion spring part and a compression spring part, and the compression spring part is extrapolated to a sleeve 3b of the third group holder 3. The torsion spring part of the holder torsion spring 4 energizes the third group holder 3 to the third group frame 8 so that the stopper part 3a of the third group holder 3 will contact the contact shaft 80 provided in the third group frame 8. That is, the holder torsion spring 4 energizes the third lens group 2 (third group holder 3) in the direction of movement from the retreat position to the image pickup position. Moreover, the compression spring part of the holder torsion spring 4 energizes the third group holder 3 to the object side in the optical axis direction so that a tip of the sleeve 3b of the third group holder 3 at the object side will contact the bearing 8a of the third group frame 8 at the object side.

The image stabilization device constituted as mentioned above is controlled by the camera controller 232 (FIG. 14) provided in the camera body 101. The camera controller 232 controls voltages applied to the pair of coils 9c on the basis of shake amounts output from a Pitch shake detector 239 and a Yaw shake detector 240 (FIG. 14) arranged in the camera body 101 so as to move the third group frame 8 in the plane that intersects perpendicularly with the optical axis. In this way, since an image shake of an object image formed on the image sensor 36 through the image pickup optical system is corrected by moving the third group holder 3 holding the third lens group 2 integrally with the third group frame 8 in a direction that corrects the image shake, a still image or a video image of which the image shake is reduced can be obtained.

Next, a position adjustment mechanism of the third lens group 2 will be described. As shown in FIG. 11, the holder shaft 50 is fitted into the sleeve 3b of the third group holder 3 in parallel to the optical axis. The holder shaft 50 has a first fixing part 50a that is held by the third group frame 8, a fitting part 50b that is slidably engaged with the third group holder 3 and that becomes a rotation center when the third group holder 3 retreats, and a first adjustment part 50c to which an adjustment tool is inserted when the position of the third lens group 2 is adjusted. In the meantime, as shown in FIG. 10, the contact shaft 80 has a second fixing part 80a that is held by the third group frame 8, a contact part 80b that contacts the stopper part 3a in the state where the third group holder 3 is in the image pickup position, and a second adjustment part 80c to which the adjustment tool is inserted when the lens is adjusted.

Figure 12:
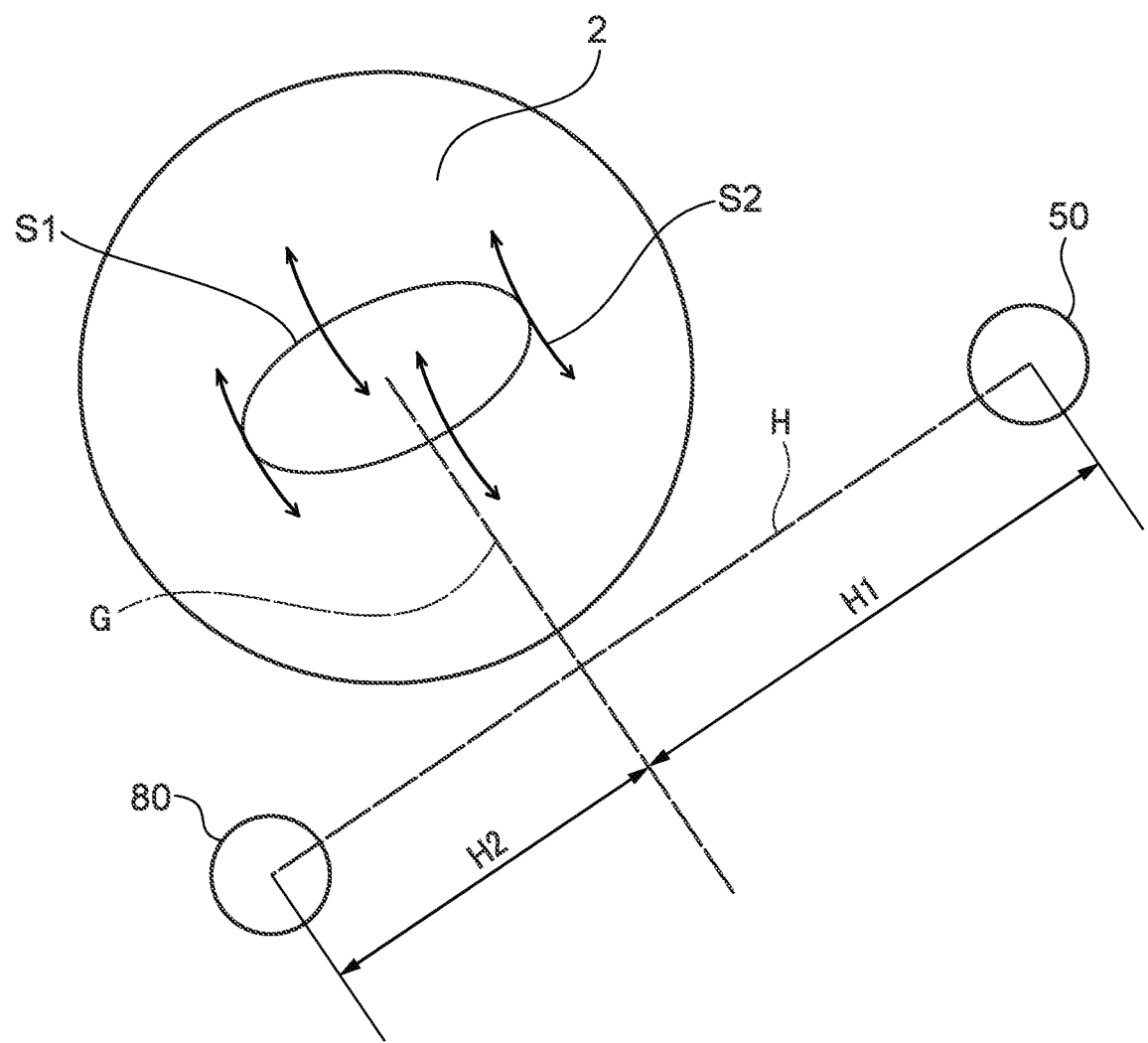
FIG. 12 is a schematic view showing a relationship among a third lens group, a holder shaft, and a contact shaft that constitute the image stabilization device in the first embodiment.

FIG. 12 is a schematic view showing a relationship among the third lens group 2, holder shaft 50, and contact shaft 80 in the image stabilization device. As shown in FIG. 11, a center axis of the first fixing part 50a and a center axis of the fitting part 50b of the holder shaft 50 are eccentric by a distance E. Accordingly, when the first adjustment part 50c is rotated, the third group holder 3 moves eccentrically, and the center of the third lens group 2 moves while drawing a locus of an ellipse S1 shown in FIG. 12.

Moreover, as shown in FIG. 10, a center axis of the second fixing section 80a and a center axis of the contact part 80b of the contact shaft 80 are eccentric by a distance F. Accordingly, when the second adjustment part 80c is rotated, the third group holder 3 moves eccentrically around the holder shaft 50 while drawing a circular arc S2 of which a radius is a straight line between the holder shaft 50 and the contact shaft 80 and of which the center is the holder shaft 50.

The distance F that is an eccentricity amount of the contact shaft 80 is more than a half of the distance E that is an eccentricity amount of the holder shaft 50 ($F \geq E/2$). Accordingly, the rotation of the contact shaft 80 enables movement of the center axis of the third lens group 2 to an arbitrary position in the ellipse S1 that is the movement locus of the center axis of the third lens group 2 drawn by rotating the holder shaft 50. That is, the third group holder 3 is freely moved in the plane that intersects perpendicularly with the optical axis by combining the elliptical movement by rotation of the holder shaft 50 and the circular arc movement by rotation of the contact shaft 80.

Moreover, the second fixing part 80a is provided between the contact part 80b and the second adjustment part 80c, and the second fixing part 80a is closer to the second adjustment part 80c than the contact part 80b. Accordingly, even if a load is applied to the second adjustment part 80c during the adjustment, the adjustment is possible while maintaining the contact shaft 80 in a stable state. Accordingly, since the simple configuration that has only two adjustment positions is achieved, a miniaturization and a cost reduction can be attained, and the lens barrel 102 that enables easy adjustment is achieved without spoiling the optical performance.

As shown in FIG. 12, a straight line that connects centers of the contact shaft 80 and holder shaft 50 is defined as a straight line H. When the straight line H is divided by a normal line G (see FIG. 6) of the line H that passes the center axis of the third lens group 2, divided lengths H1 and H2 satisfy a relationship of "$H1 \geq H2$". In this way, when an ellipticity of the elliptic movement of the third lens group 2 by the rotation of the holder shaft 50 becomes large, the adjustment becomes easier because the elliptic movement of the third lens group 2 is approximated to a linear movement approximately parallel to the straight line H.

Furthermore, the first adjustment part 50c and the second adjustment part 80c are provided at the side of the image pickup surface of the image sensor 36 not at the object side along the optical axis. That is, the first adjustment part 50c and the second adjustment part 80c are provided in the same direction. Thereby, the engagement of the adjustment tool to the first adjustment part 50c and the second adjustment part 80c becomes easy during a manufacturing process of the lens barrel 102, which enables cost reduction due to reduction of a manufacturing cost.

The third group frame 8 holding the holder shaft 50 and contact shaft 80 is energized by the thrust springs 14 (see FIG. 7A) to the side of the image sensor 36 in the optical axis direction with respect to the third group base plate 9. Thereby, even if a large force is applied to the first adjustment part 50c or the second adjustment part 80c by the engagement of the adjustment tool during the manufacturing process of the lens barrel 102, the large force is applied in a direction opposite to the energizing direction of the thrust springs 14. Accordingly, since such a large force does not cause a damage such as dents occurring in the ball receiving surfaces 8b and the ball holes 9a etc., the balls 13 can roll smoothly, which enables to maintain high optical performance (image stabilization performance).

Figure 13A:
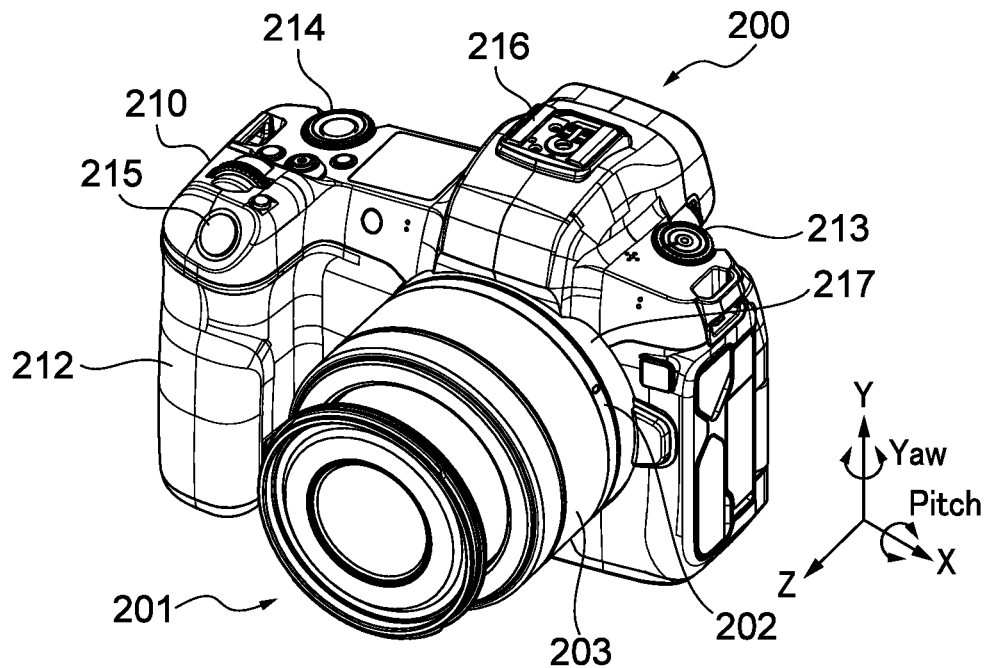
FIG. 13A and FIG. 13B are external perspective views showing a digital camera according to a second embodiment.
Figure 13B:
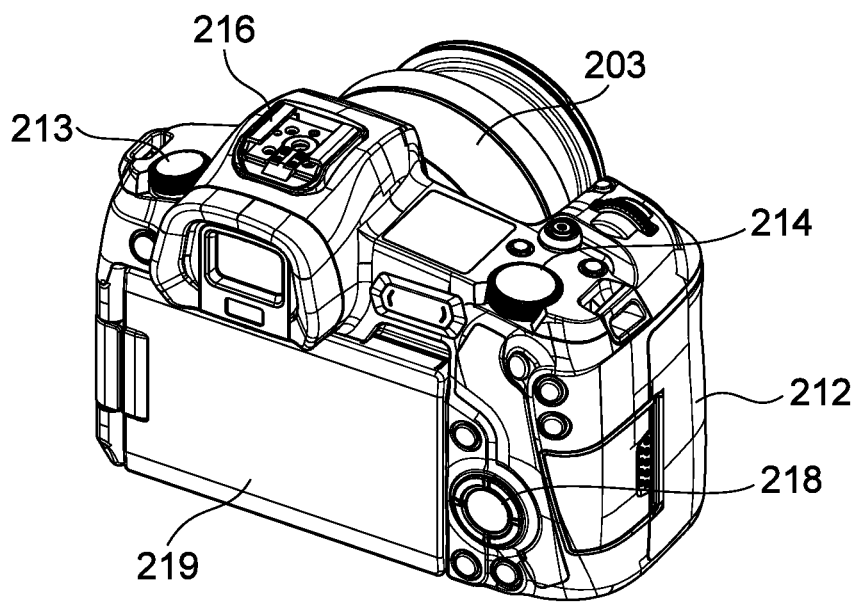

Next, a second embodiment will be described. FIG. 13A is an external perspective view showing a digital camera 200 according to the second embodiment from a front side. FIG. 13B is an external perspective view showing the digital camera 200 from a back side. The digital camera 200 has a camera body 210 and a lens barrel 201 (interchangeable lens) that is detachable from to the camera body 210.

As shown in FIG. 13A, XYZ axes that intersect perpendicularly mutually are defined to the digital camera 200 for convenience of description. A direction (an optical axis direction) along which an optical axis of an image pickup optical system built in the lens barrel 201 (hereinafter referred to as an "optical axis" simply) is prolonged shall be a Z-axis direction. When the Z-axis is parallel to a horizontal direction, the X-axis intersects perpendicularly with the Z-axis in a horizontal plane, and the Y-axis intersects perpendicularly with the horizontal plane. It should be noted that the X-axis direction is a width direction of the camera body 210, the Y-axis direction is a height direction of the camera body 210, and the Z-axis direction is a front-and-back direction of the camera body 210. Moreover, in the following description, a rotational direction around the X-axis (the X-axis is a rotation center) shall be a Pitch direction, and a rotational direction around the Y-axis shall be a Yaw direction.

A grip part 212 used when a user grasps the camera body 210 by a hand is provided in a part of a left side viewed from the front side (a right side viewed from the back side) of the camera body 210. A power operation member 213 is arranged at an upper surface of the camera body 210. When the camera body 210 is in a power OFF state and a user performs an ON operation of the power operation member 213, electrification is started inside the digital camera 200 and the camera body 210 shifts to a power ON state. When the camera body 210 is in the power ON state, the camera controller 232 (see FIG. 14) runs a predetermined computer program and the digital camera 200 shifts to an image-pickup-ready state. On the contrary, when the camera body 210 is in the power ON state and the user performs an OFF operation of the power operation member 213, the camera body 210 shifts to the power OFF state.

A mode dial 214, a release button 215, and an accessory shoe 216 are also provided in the upper surface of the camera body 210. Image pickup modes can be switched when the user rotationally operates the mode dial 214, The image pickup modes include a video image pickup mode for picking up a video image, an automatic still image pickup mode in which a proper exposure amount is automatically obtained, and a manual still image pickup mode in which the user can arbitrarily set image pickup conditions, such as a shutter speed and an aperture value. The camera controller 232 performs image pickup preparation operations, such as an auto-focus operation and an automatic exposure control, in response to a half press operation of the release button 215, and performs an image pickup operation in response to a full press operation. The accessory shoe 216 can be equipped with accessories, such as an external flash device.

The lens barrel 201 is mechanically and electrically connected to a camera mount 217 provided in the camera body 210 through a lens mount 202. The image pickup optical system that forms an object image on an image sensor 236 (see FIG. 14) by imaging light from an object is contained inside the lens barrel 201. A zoom operation ring 203 that is rotatable around the optical axis by a user's operation is provided in an outer circumference of the lens barrel 201. When the zoom operation ring 203 is rotationally operated, zoom lens groups that constitute the image pickup optical system move to predetermined positions corresponding to an angle of the zoom operation ring 203. Thereby, the user can pick up an image at a desired field angle.

Back operation members 218 and a display unit 219 are provided in the back face of the camera body 210, The back operation members 218 includes a plurality of buttons and a dial to which various functions are allocated. When the camera body 210 is in the power ON state, and when the still image pickup mode or the video image pickup mode is set, a through image of the object image currently picked up by the image sensor 236 is displayed on the display unit 219. Moreover, image pickup parameters that show image pickup conditions, such as a shutter speed and an aperture value, are displayed on the display unit 219. The user can change the image pickup parameters to desired set values by operating the back operation members 218 while looking at the display. The back operation members 218 include a play button that is used to designate reproduction of a recorded pickup image. When the play button is operated, a pickup image recorded in a storage unit 233 (see FIG. 14) is reproduced and displayed on the display unit 219.

Figure 14:
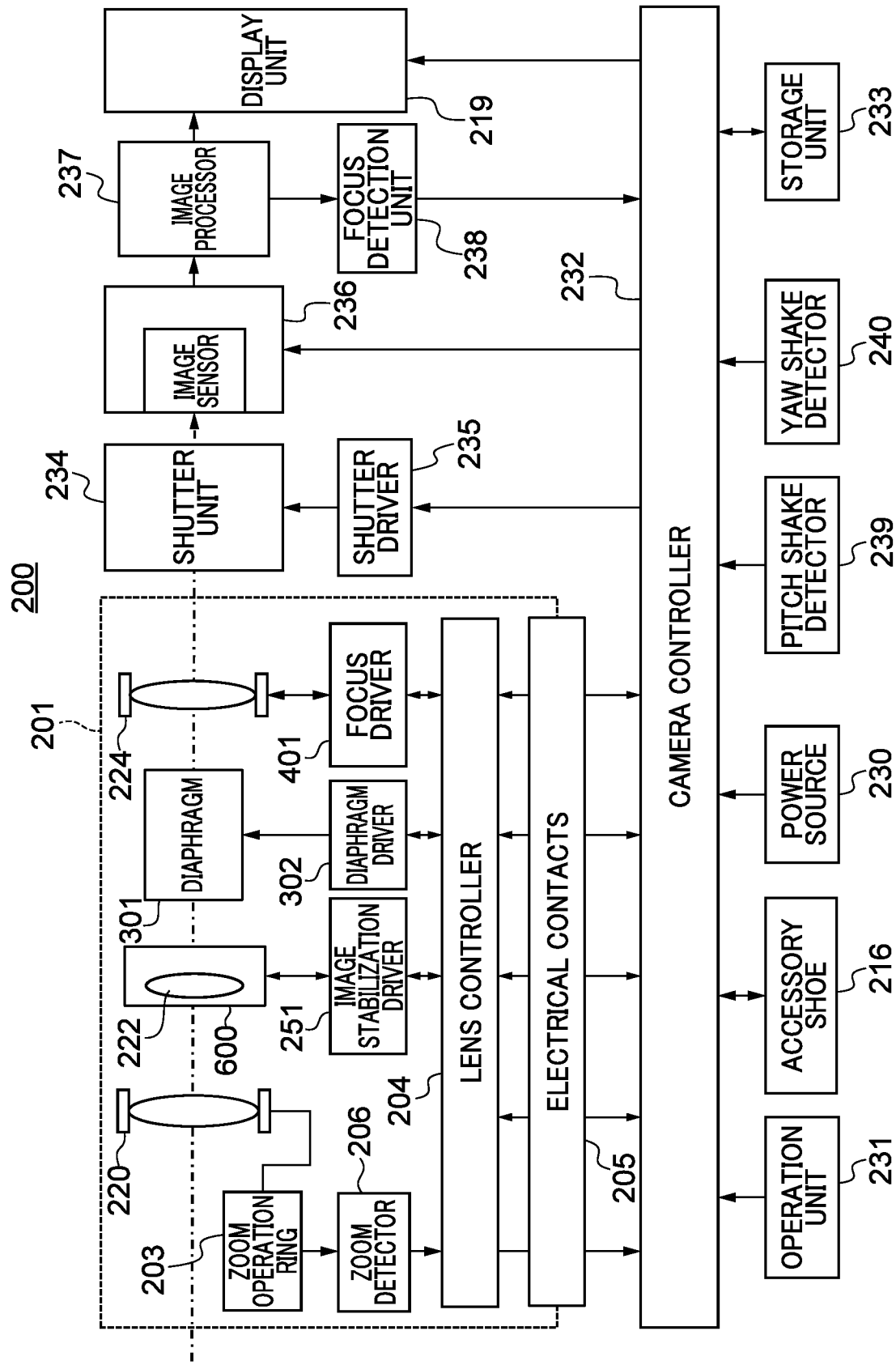
FIG. 14 is a block diagram schematically showing a configuration of the digital camera according to the second embodiment.

FIG. 14 is a block diagram showing an electric configuration and an optical configuration of the digital camera 200. The camera body 210 is provided with a power source 230 that supplies electric power to the camera body 210 and lens barrel 201. Moreover, the camera body 210 has an operation unit 231 including the power operation member 213, the mode dial 214, the release button 215, the back operation members 218, and a touch panel function of the display unit 219. Entire system control of the digital camera 200 is performed by cooperation of the camera controller 232 provided in the camera body 210 and a lens controller 204 provided in the lens barrel 201.

The camera controller 232 reads and runs a computer program stored in the storage unit 233. At this time, the camera controller 232 communicates various kinds of control signals, data, etc. with the lens controllers 204 through communication terminals of electrical contacts 205 provided in the lens mount 202. The electrical contacts 205 include power supply terminals that supply the electric power from the power source 230 to the lens barrel 201.

The image pickup optical system provided in the lens barrel 201 has the zoom lens groups 220 that are connected with the zoom operation ring 203 and change the field angle by moving in the optical axis direction, and an image stabilization device 600 including a shift lens 222 as an image stabilization element. The image stabilization device 600 reduces an image shake by shifting (moving (displacing)) the shift lens 222 in an arbitrary direction in the XY plane that intersects perpendicularly with the optical axis. The details of the configuration of the image stabilization device 600 are mentioned later.

Moreover, the image pickup optical system has a diaphragm unit 301 that adjusts a light amount, and a focus lens group 224 including a focusing lens that moves in the optical axis direction to adjust focus. Furthermore, the lens barrel 201 has an image stabilization driver 251 that drives the image stabilization device 600, a diaphragm driver 302 that drives the diaphragm unit 301, and a focus driver 401 that moves the focus lens group 224.

The camera body 210 has a shutter unit 234, a shutter driver 235, the image sensor 236, an image processor 237, and the camera controller 232. The shutter unit 234 controls an amount of object light that passes the image pickup optical system in the lens barrel 201 and forms an image on the image sensor 236. The image sensor 236 photoelectrically converts the optical image (object image) of the object formed on the image pickup surface and outputs an image pickup signal. The image processor 237 applies various image processes to the image pickup signal and generates an image signal. Since the display unit 219 has been already described with reference to FIG. 13B, its description is omitted.

The camera controller 232 controls the focus driver 401 in response to the image pickup preparation operation (half press operation of the release button 215, etc.) to the operation unit 231. For example, when the auto-focus operation is designated, a focus detection unit 238 determines a focus state of the object image formed to the image sensor 236 using the image signal generated by the image processor 237, generates a focus signal, and transmits it to the camera controller 232. In parallel to this, the focus driver 401 transmits information about the current position of the focus lens group 224 to the camera controller 232. Then, the camera controller 232 finds a defocus amount by comparing the focus state of the object image with the current position of the focus lens group 224, calculates a focus driving amount from the defocus amount, and transmits the focus driving amount to the lens controller 204. The lens controller 204 moves the focus lens group 224 to a target position in the optical axis direction through the focus driver 401 using the obtained focus driving amount. Thereby, the defocus of the object image is corrected and a state focused on the object is obtained.

The focus driver 401 is provided with a focusing motor (not shown) and a photointerrupter (not shown) that detects a home position of the focus lens group 224. As the focusing motor, a stepping motor can be used. However, a DC motor with an encoder or an ultrasonic motor (vibration actuator) may be used. Moreover, a photo reflector or a brush that contacts a conductive pattern and detects a signal electrically may be used in place of the photointerrupter.

The camera controller 232 controls the drives of the diaphragm unit 301 and shutter unit 234 through the diaphragm driver 302 and shutter driver 235 on the basis of the aperture value and the set value of the shutter speed received from the operation unit 231. For example, when an operation of automatic exposure control is designated, the camera controller 232 performs photometry calculation by receiving a luminance signal generated by the image processor 237. The camera controller 232 controls the diaphragm driver 302 on the basis of the obtained photometry calculation result in response to an image pickup instruction operation (the full press operation of the release button 215, etc.) to the operation unit 231. In parallel to this, the camera controller 232 controls the drive of the shutter unit 234 through the shutter driver 235 to perform an exposure process to the image sensor 236.

The camera body 210 has a Pitch shake detector 239 and Yaw shake detector 240 as detection units that can detect an angular shake due to a camera shake by a user. The Pitch shake detector 239 detects a camera shake in the Pitch direction using an angular speed sensor (a vibration gyroscope) or an angular acceleration sensor and outputs a shake signal. Similarly; the Yaw shake detector 240 detects a camera shake in the Yaw direction and outputs a shake signal. The camera controller 232 calculates a shift position of the shift lens 222 in the Y-axis direction that counteracts the Pitch shake using the shake signal obtained from the Pitch shake detector 239. Moreover, the camera controller 232 calculates a shift position of the shift lens 222 in the X-axis direction that counteracts the Yaw shake using the shake signal obtained from the Yaw shake detector 240. The camera controller 232 drives the image stabilization device 600 through the image stabilization driver 251 depending on the calculated shift positions in the Pitch direction and Yaw direction to move the shift lens 222 to the target position in the X-axis direction and Y-axis direction. Thereby, the image shake during the exposure and during display of the through image is reduced.

The lens barrel 201 has the zoom operation ring 203 that changes the field angle of the image pickup optical system and a zoom detector 206 that detects the angle of the zoom operation ring 203. The zoom detector 206 is constituted using a resistance linear potentiometer, for example, and detects the angle of the zoom operation ring 203 that is operated by the user as an absolute value. The field-angle information detected by the zoom detector 206 is reflected to various kinds of control by the camera controller 232 after being transmitted to the lens controller 204. It should be noted that a part of the above-mentioned information is recorded in the storage unit 233 or a recording medium (not shown) together with a pickup image (image data).

Figure 15:
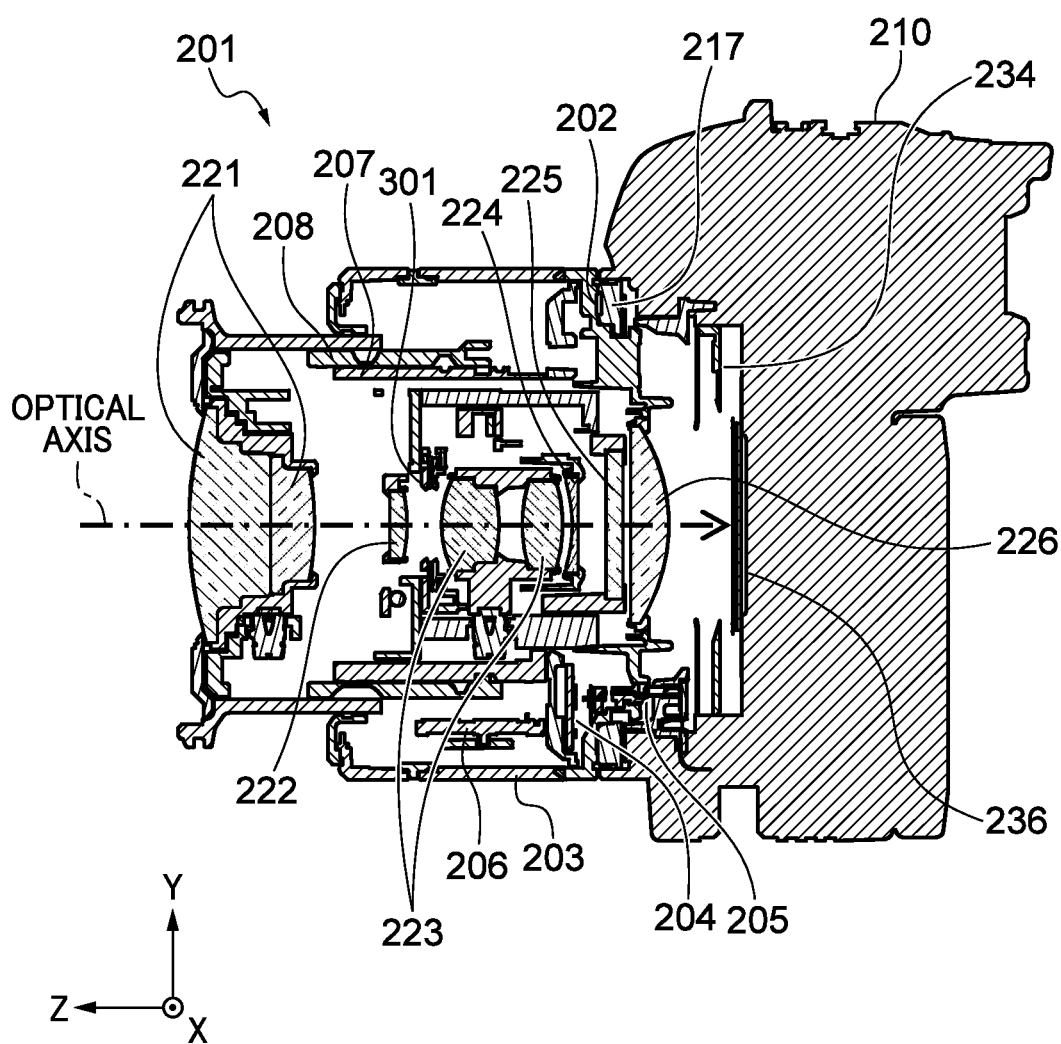
FIG. 15 is a sectional view showing a state of a wide angle end of the lens barrel in the second embodiment.
Figure 16:
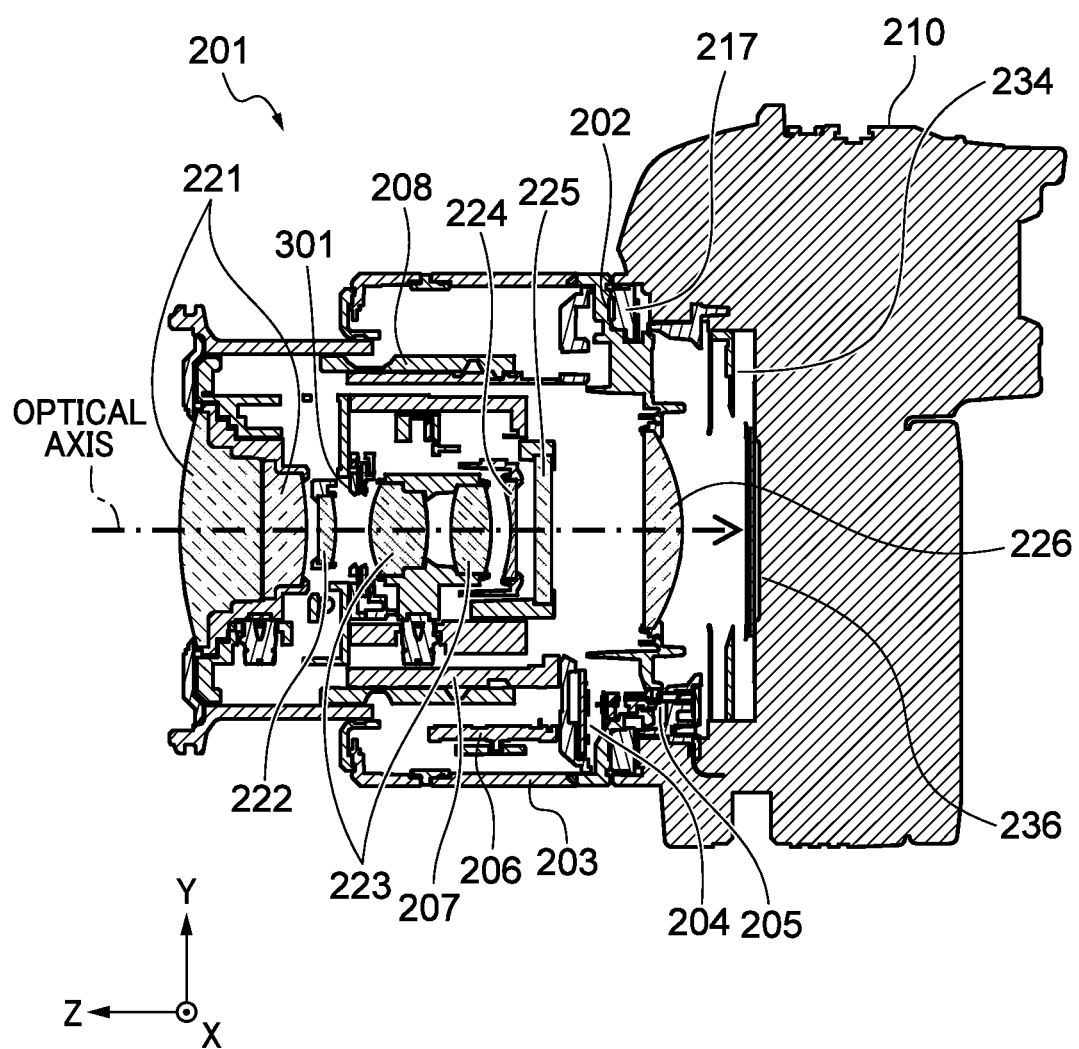
FIG. 16 is a sectional view showing a state of a telephoto end of the lens barrel in the second embodiment.
Figure 17:
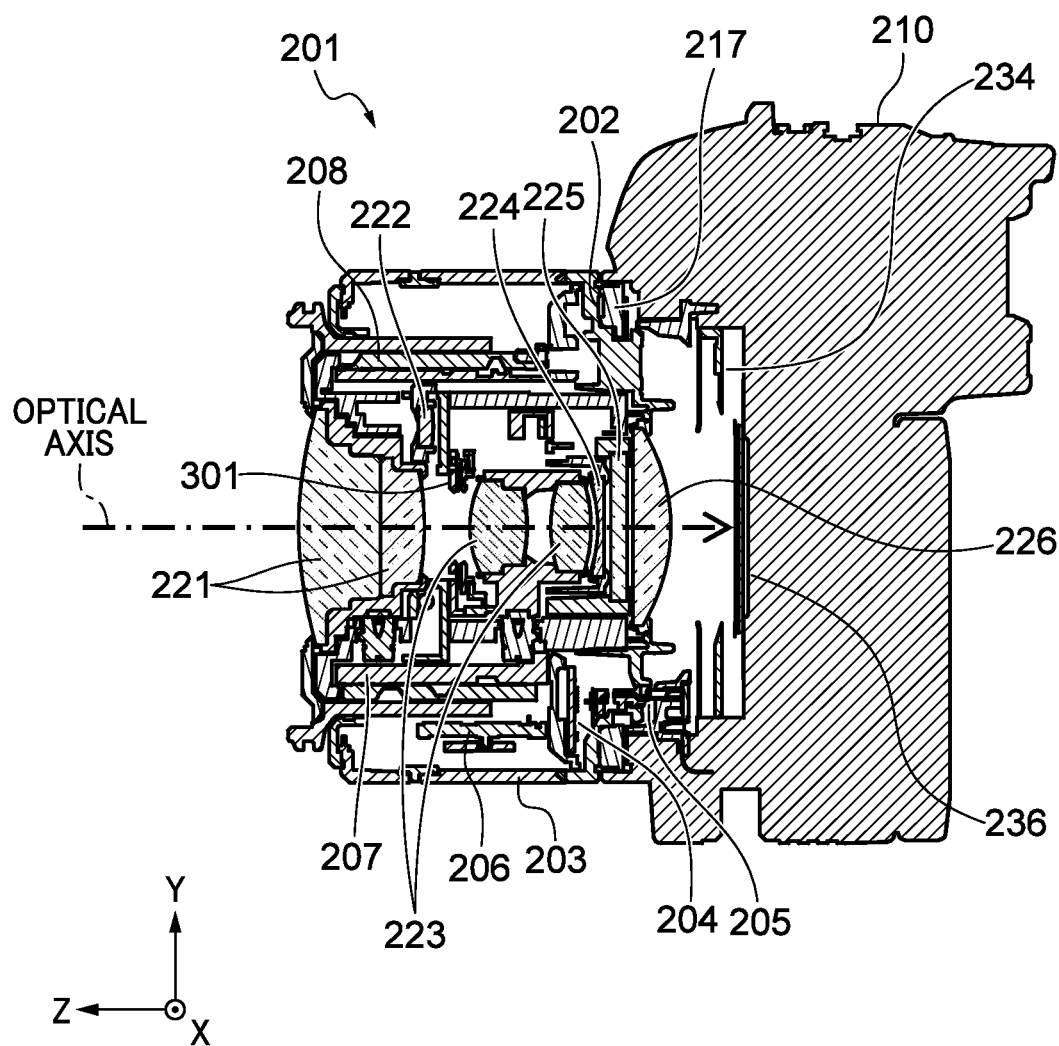
FIG. 17 is a sectional view showing a retracted state of the lens barrel in the second embodiment.

Next, a positional relationship among main components of the lens barrel 201 will be described by referring to FIG. 15 through FIG. 17. FIG. 15 through FIG. 17 are YZ sectional views (sectional views that intersect perpendicularly with the X-axis) showing the digital camera 200, and are shown by the sections including the optical axis. FIG. 15 shows a state where the lens barrel 201 is set to a wide angle end at a short focal length side. FIG. 16 shows a state where the lens barrel 201 is set to a telephoto end at a long focal length side. FIG. 17 shows the retracted state in which the overall length of the lens barrel 201 becomes the shortest.

The lens barrel 201 employs a six group configuration as an example of the image pickup optical system that takes in the incident light and forms an image on the image sensor 236. The image pickup optical system consists of a first lens group 221, the shift lens 222 (a second lens group), the diaphragm unit 301, a third lens group 223, the focus lens group 224 (fourth lens group), a fifth lens group 225, and a sixth lens group 226. The first through fifth lens groups 221 through 225 are equivalent to the zoom lens groups 220 in FIG. 14, and change the image pickup magnification by moving in the optical axis direction between the wide angle end and telephoto end. It should be noted that the configuration of the lens groups does not limit the configuration of the image pickup optical system of the lens barrel 201. For example, other functions may be given to the shift lens 222 and focus lens group 224. Moreover, some lens groups of the first through fifth lens groups 221 through 225 may be fixed without moving during zooming.

The lens barrel 201 has a rectilinear guide barrel 207 and a cam barrel 208. Cam followers (not shown) are formed in an inner periphery of the cam barrel 208. Moreover, the cam barrel 208 is connected to the zoom operation ring 203 through keys (not shown). When the zoom operation ring 203 is rotationally operated, the cam barrel 208 moves in the optical axis direction while rotating around the optical axis by slidable engagement of cam grooves and the cam followers.

The rectilinear guide barrel 207 is arranged inside the cam barrel 208 and is fixed to the lens mount 202 through a fixed barrel (not shown). Cam grooves (not shown) are formed in an outer periphery of the rectilinear guide barrel 207 in equally divided positions. Moreover, rectilinear guide grooves that regulate the rotations of the first through fifth lens groups 221 through 225 and guide their rectilinear movements in the optical axis direction are formed in an inner periphery of the rectilinear guide barrel 207 in equally divided positions. In the meantime, cam grooves that have loci of different angles in the rotational direction are formed in the cam barrel 208 corresponding to the first through fifth lens group 221 through 225 in equally divided positions.

The first through fifth lens groups 221 through 225 are provided with a plurality of cam followers that are slidably engaged with the rectilinear guide grooves of the rectilinear guide barrel 207 and the cam grooves of the cam barrel 208. When the zoom operation ring 203 is rotationally operated, the cam barrel 208 rotates. In connection with this, the first through fifth lens groups 221 through 225 move in the optical axis direction in a state where rotations around the optical axis are regulated.

The lens barrel 201 has a retraction mechanism (not shown) and a retreat mechanism of the shift lens 222. In unused time of the lens barrel 201 (digital camera 200), the retraction mechanism further retracts the first, third, fourth and fifth lens groups 221, 223, 224, and 225 to the back side (the side of the camera body 210) and the retreat mechanism moves the shift lens 222 to the retreat position outside the optical axis. Accordingly, portability is improved by shortening the overall length of the lens barrel 201. In the state shown in FIG. 15 where the lens barrel 201 is set to the wide angle end, the distance between the first lens group 221 and the shift lens 222 is large. In a state shown in FIG. 16 where the lens barrel 201 is set to the telephoto end, the distance between the fifth lens group 225 and the sixth lens group 226 is large. The retraction mechanism shortens the overall length of the lens barrel 201 in the optical axis direction in the unused time by moving the lens groups, which are arranged at predetermined distances in use time, to housing positions that are close mutually.

As shown in FIG. 17, when the lens barrel 201 is in the retracted state, the first, third, fourth, and fifth lens groups 221, 223, 224, and 225 are moved to the housing positions that are close mutually. When the zoom operation ring 203 is rotationally operated to the wide angle end in the retracted state, the first, third, fourth, and fifth lens groups 221, 223, 224, and 225 extend to the front side (object side) and move to the predetermined use positions and the shift lens 222 is returned to the image pickup position on the optical axis. Thereby, the lens barrel 201 shifts to the state in the use time shown in FIG. 15.

As shown in FIG. 15 and FIG. 16, in the use time of the lens barrel 201 (the image pickup time of the digital camera 200), the first through sixth lens groups 221 through 226 are arranged in the predetermined positions on the optical axis. When the zoom operation ring 203 is rotationally operated from the state (FIG. 15) where the lens barrel 201 is set to the wide angle end to the retracted state, the first, third, fourth, and fifth lens groups 221, 223, 224, and 225 start retracting to the back side. At the same time, the shift lens 222 retreats from the optical axis. That is, when the lens barrel 201 varies from the state at the use time to the retracted state at the unused time, the shift lens 222 moves from the predetermined image pickup position at the use time to the predetermined retreat position that is separated from the optical axis by a predetermined distance in the direction (radial direction) that intersects perpendicularly with the optical axis. The shift lens 222 moves from the image pickup position to the retreat position in the similar manner to the retreat of the third group holder 3 (third lens group 2) in the first embodiment. When the first lens group 221 is moved into a space generated by the retreat of the shift lens 222 and is stored without mutual interference, the lens barrel 201 reaches the state shown in FIG. 17 where the overall length is the shortest.

Figure 18:
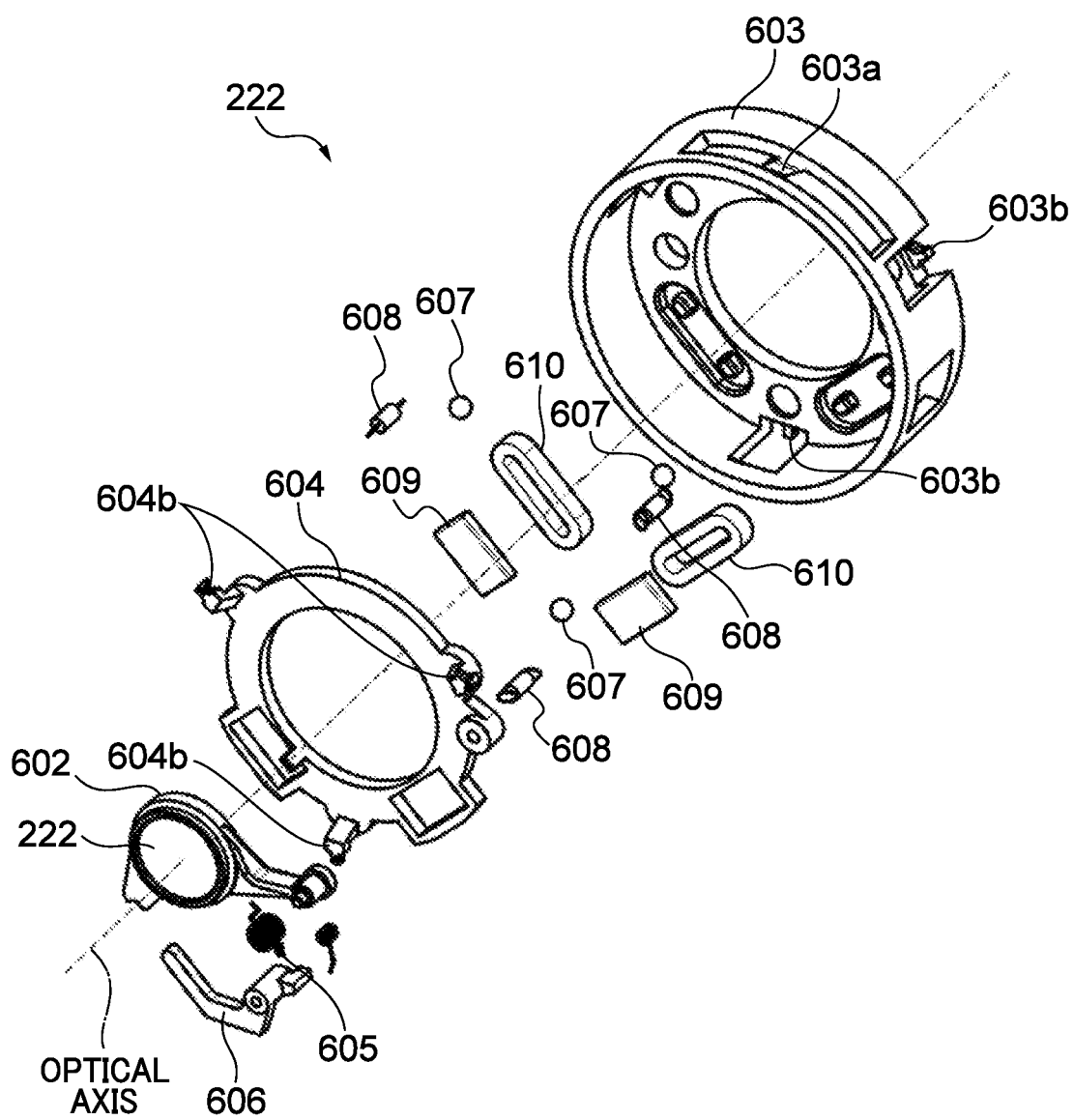
FIG. 18 is an exploded perspective view showing a configuration of an image stabilization device in the second embodiment.
Figure 19:
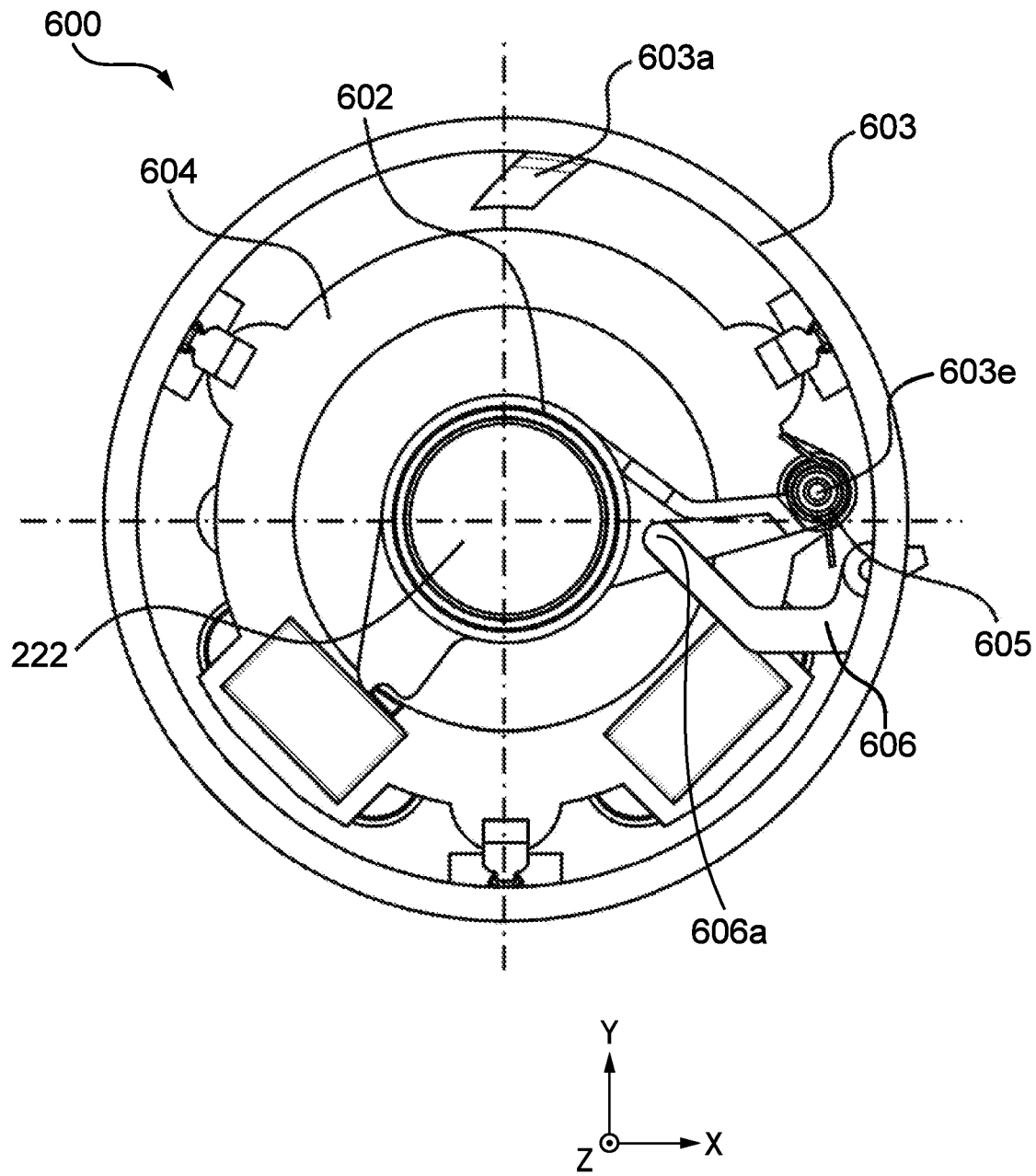
FIG. 19 is a front view showing an image-pickup state of the image stabilization device in the first embodiment.
Figure 20:
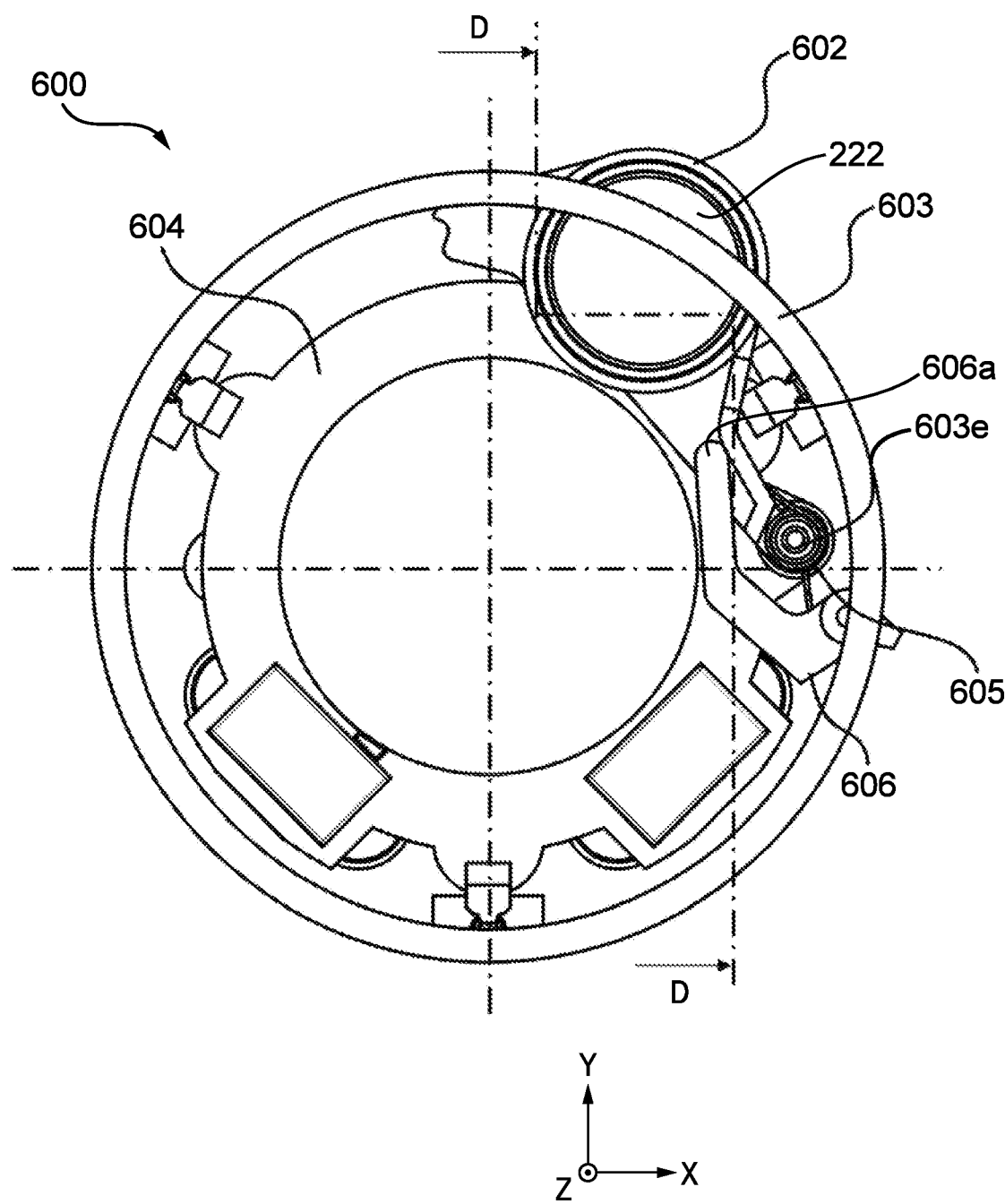
FIG. 20 is a front view showing a non-image-pickup state of the image stabilization device according to the second embodiment.

FIG. 18 is an exploded perspective view viewed from the front side showing the image stabilization device 600 including the shift lens 222. FIG. 19 is a front view showing the image stabilization device 600 in the state where the shift lens 222 is in the image pickup position. FIG. 20 is a front view showing the image stabilization device 600 in the state where the shift lens 222 is in the retreat position.

The image stabilization device 600 has the shift lens 222, a lens frame 602, a base member 603, a shift member 604, a torsion spring 605, a retreating lever 606, three balls 607 (rolling members), and three springs 608. The lens frame 602 is a holding member holding the shift lens 222. The lens frame 602 is rotatably supported by a bearing of the shift member 604 via a rotation shaft 603e that is press fit to the base member 603 in parallel to the optical axis. Moreover, the shift lens 222 and the lens frame 602 move in the plane that intersects perpendicularly with the optical axis integrally with the shift member 604 during the image stabilization.

The torsion spring 605 is an energizing member that is extrapolated to the base member 603 and energizes the lens frame 602 in the direction moving from the retreat position to the image pickup position with respect to the shift member 604. The shift member 604 is provided with three ball receiving surfaces 604c (see FIG. 21) that respectively contact the three balls 607 and three spring hooks 604b to which one-side ends of the three springs 608 are hooked, respectively. Moreover, a pair of magnets 609 are arranged on the shift member 604 at positions separated by 90 degrees in the circumferential direction in a plane that intersects perpendicularly with the optical axis.

The base member 603 is provided with three spring hooks 603b to which other-side ends of the three springs 608 are hooked, respectively. The three balls 607 can roll in a plane that intersects perpendicularly with the optical axis in a state where the balls 607 are nipped between the ball receiving surfaces 604c of the shift member 604 and ball receiving surfaces 603c (see FIG. 21) of the base member 603 by the energization forces of the three springs 608.

A pair of coils 610 are arranged on the base member 603 in the same phase as the pair of magnets 609. When an electric current is supplied to the pair of coils 610, Lorentz forces will generate between the coils 610 and the magnetisms of the magnets 609, The generated Lorentz forces move the shift member 604 with respect to the base member 603 in a plane that intersects perpendicularly with the optical axis.

It should be noted that the movable range of the shift member 604 in the plane that intersects perpendicularly with the optical axis is limited because the outer circumference of the shift member 604 can contact an inner periphery of the base member 603, For example, an approaching part 603a (see FIG. 18 and FIG. 19) of the base member 603 can be constituted so that some parts of a side surface of the base member 603 may be used for limiting the movement of the shift member 604.

The retreating lever 606 is attached to the outer periphery of the base member 603 in a position close to a groove (not shown) formed in the cam barrel 208. When the cam barrel 208 rotates towards the retracted position, a part of the retreating lever 606 engages with the groove of the cam barrel 208 in accordance with the rectilinear movement of the cam barrel 208 with respect to the rectilinear guide barrel 207. Thereby, the retreating lever 606 rotates in a plane that intersects perpendicularly with the optical axis around the rotation shaft 603e in accordance with the movement of the cam barrel 208, and a tip portion 606a of the retreating lever 606 pushes the lens frame 602. As a result, the lens frame 602 rotates against the spring force of the torsion spring 605, and the shift lens 222 moves to the retreat position.

Figure 21:
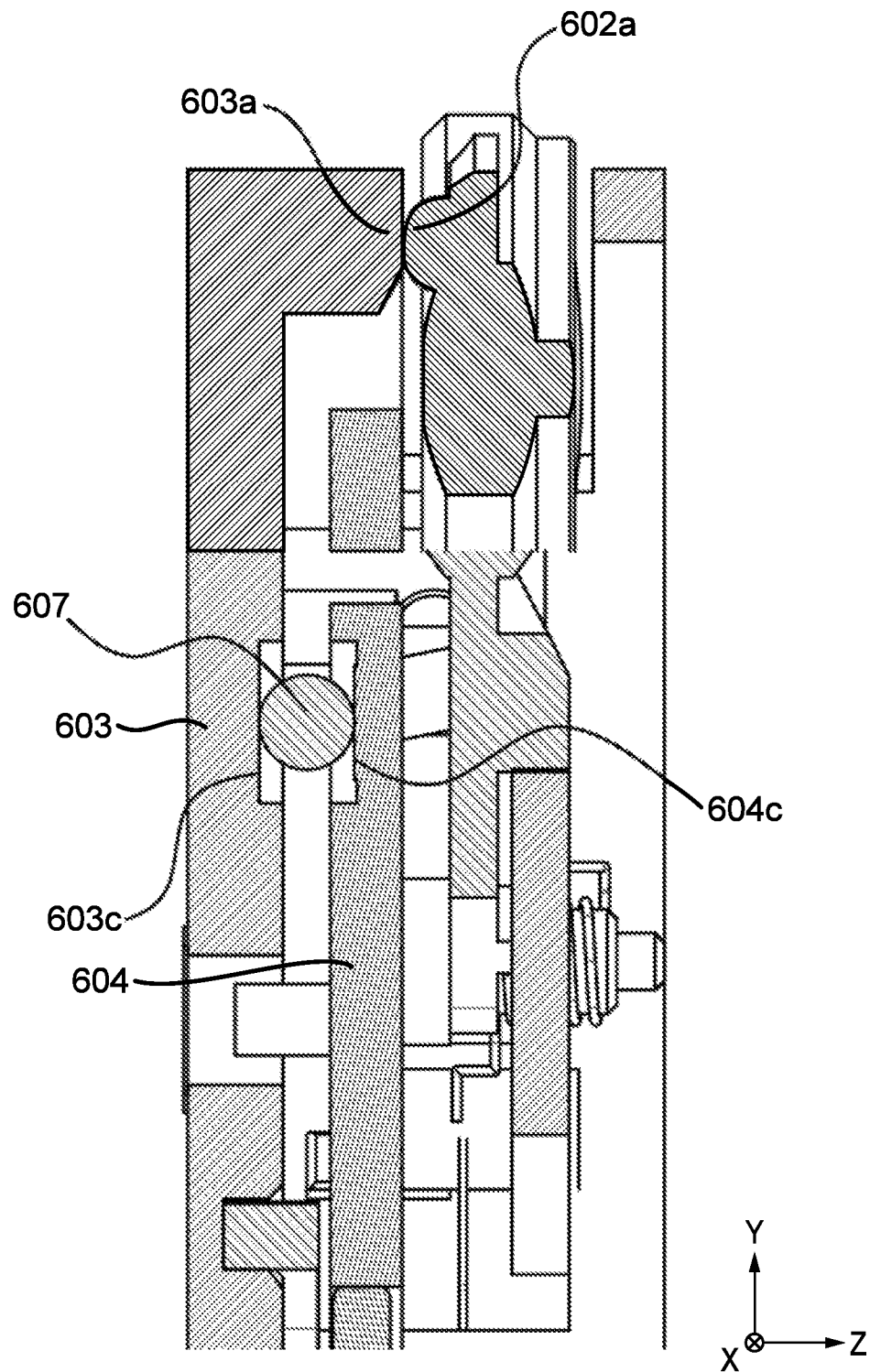
FIG. 21 is a first sectional view showing the image stabilization device taken along a line D-D shown in FIG. 20.

FIG. 21 is a first sectional view taken along a line D-D shown in FIG. 20 showing a relationship between the lens frame 602 and base member 603 in the state where the shift lens 222 the retreat position. When the state where the shift lens 222 is in the retreat position is viewed in the optical axis direction, a part of the shift lens 222 is protruded outside from the outer circumference of the base member 603. The lens frame 602 has a projecting part 602a protruded to the side of the base member 603. The approaching part 603a (see FIG. 18 and FIG. 19) of the base member 603 approaches the projecting part 602a of the lens frame 602 in the state where the shift lens 222 is in the retreat position. In other words, the projecting part 602a of the lens frame 602 and the approaching part 603a of the base member 603 are provided in the position that approach mutually in the state where the shift lens 222 is in the retreat position.

Thereby, when an external force, such as a dropping impact, is applied in the state where the shift lens 222 is in the retreat position, the projecting part 602a and the approaching part 603a near a lens centroid collide and receive the external force. This reduces the external force acting on the balls 607 and the ball receiving surfaces 603c and 604c, which reduces a risk of a damage such as dents occurring in the balls 607 and the ball receiving surfaces 603c and 604c. As the result, degradation of the rolling performance of the balls 607 is reduced and degradation of the image stabilization performance is reduced.

Incidentally, although the configuration where the projecting part 602a provided in the lens frame 602 and the approaching part 603a provided in the base member 603 approach mutually in the state where the shift lens 222 is in the retreat position is described, these may partially contact in the optical axis direction.

When the configuration where the projecting part 602a and the approaching part 603a contact is employed, it is preferable to form the approaching part 603a to have an inclined surface that becomes closer to the lens frame 602 in the optical direction as it goes away from the optical axis to the outer circumference as shown in FIG. 21. Thereby, when the lens frame 602 moves from the image pickup position in FIG. 19 toward the retreat position in FIG. 20, the projecting part 602a can be smoothly moved by riding upon the inclined surface of the approaching part 603a.

Figure 22:
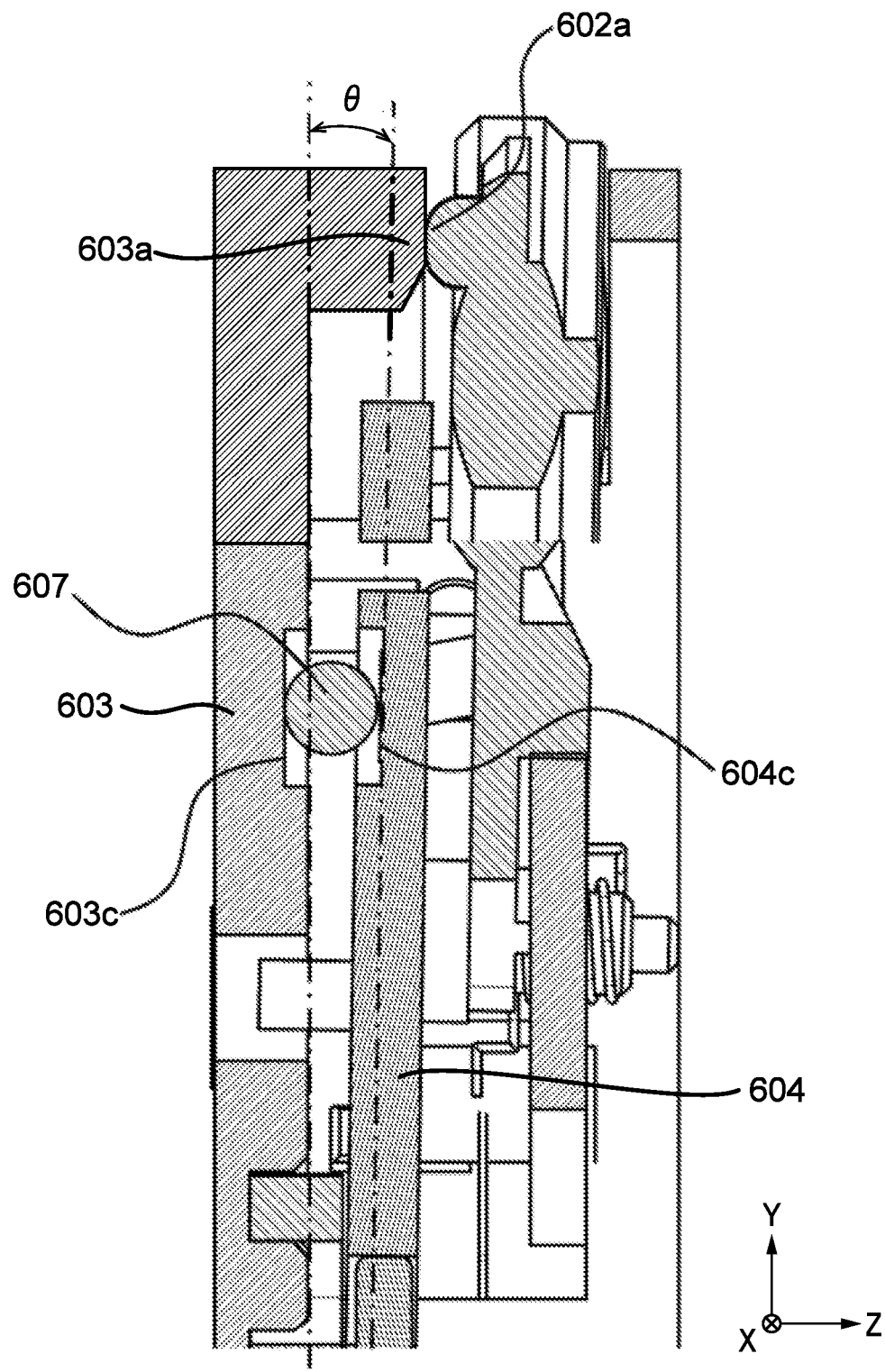
FIG. 22 is a second sectional view showing the image stabilization device taken along the line D-D shown in FIG. 20.

FIG. 22 is a second sectional view taken along the line D-D shown in FIG. 20 showing a state where the shift member 604 holding the lens frame 602 is inclined by an angle θ with respect to a plane that intersects perpendicularly with the optical axis because the projecting part 602a moves by riding upon the approaching part 603a. It should be noted that the shift member 604 is parallel to the plane that intersects perpendicularly with the optical axis in FIG. 21.

In the state in FIG. 22 where the shift lens 222 is in the retreat position, an external force (impact) is certainly received by the projecting part 602a and the approaching part 603a. Moreover, at least one of the three balls 607 has a gap between the ball receiving surface 604c of the shift member 604 and the ball receiving surface 603c of the base member 603. Accordingly, even if the lens frame 602 receives an impact, a risk of a damage such as dents occurring in the balls 607 and the ball receiving surfaces 603c and 604c is reduced because the projecting part 602a and the approaching part 603a receive the impact. This effect significantly appears in a ball 607 and its ball receiving surfaces nearest to the projecting part 602a near the centroid of the shift lens 222 in the retreat position.

In the second embodiment, as mentioned above, even when the image stabilization device 600 receives an external force, such as an impact, in the state e the shift lens 222 is in the retreat position, the risk of a damage such as dents occurring in the balls 607 and the ball receiving surfaces 603c and 604c can be reduced. Thereby, the performance decrement of the image stabilization during the image pickup operation can be reduced. Moreover, in the second embodiment, the damage to the balls 607 and the ball receiving surfaces 603c and 604c can be avoided only by changing a shape of a part of the component of a general image stabilization device, and it is not necessary to provide a new member etc. Accordingly, enlargement of the image stabilization device 600 is avoided, and also enlargement of the lens barrel 801 is avoided.

Figure 23:
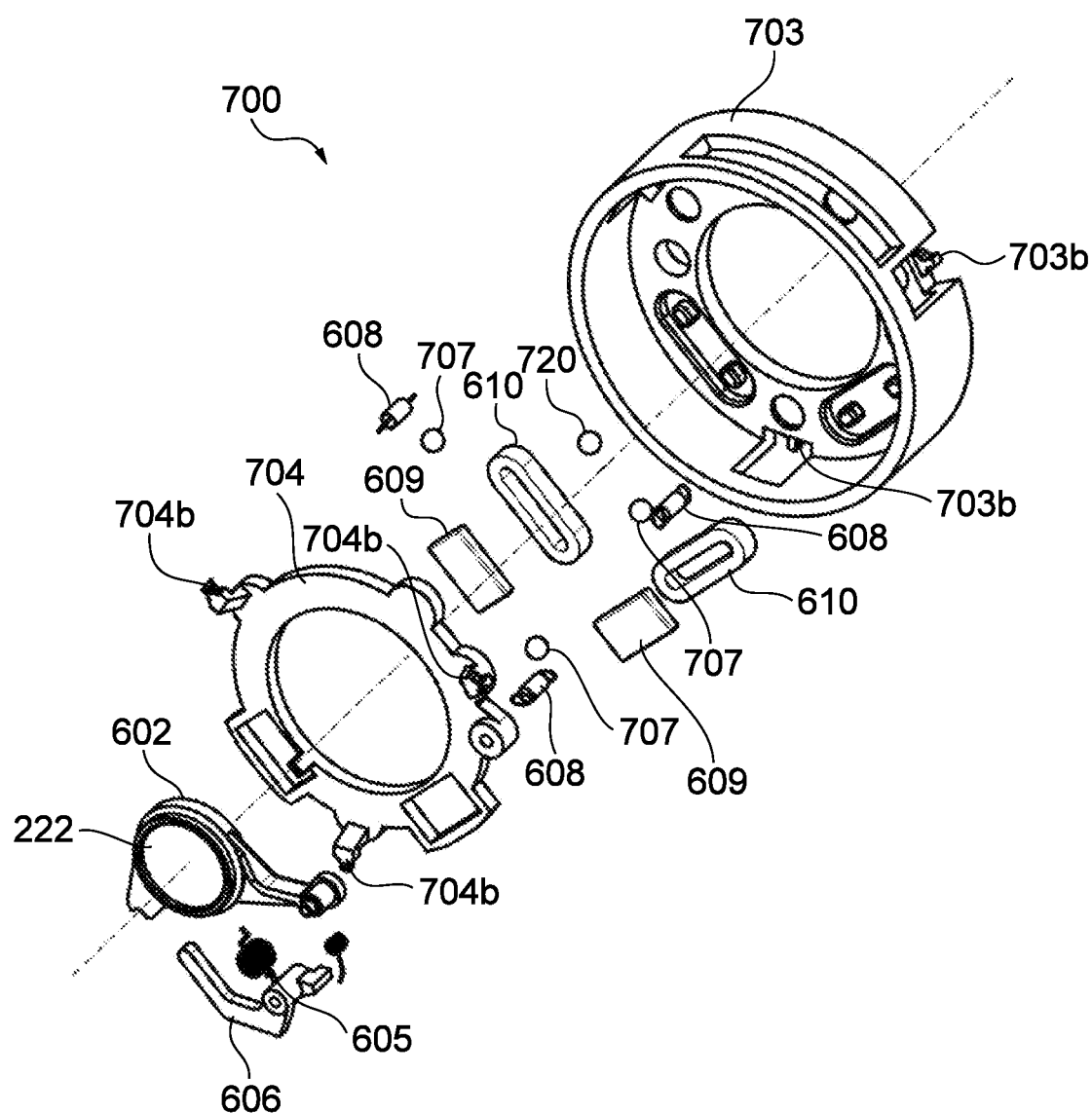
FIG. 23 is an exploded perspective view showing a configuration of an image stabilization device according to a third embodiment.
Figure 24:
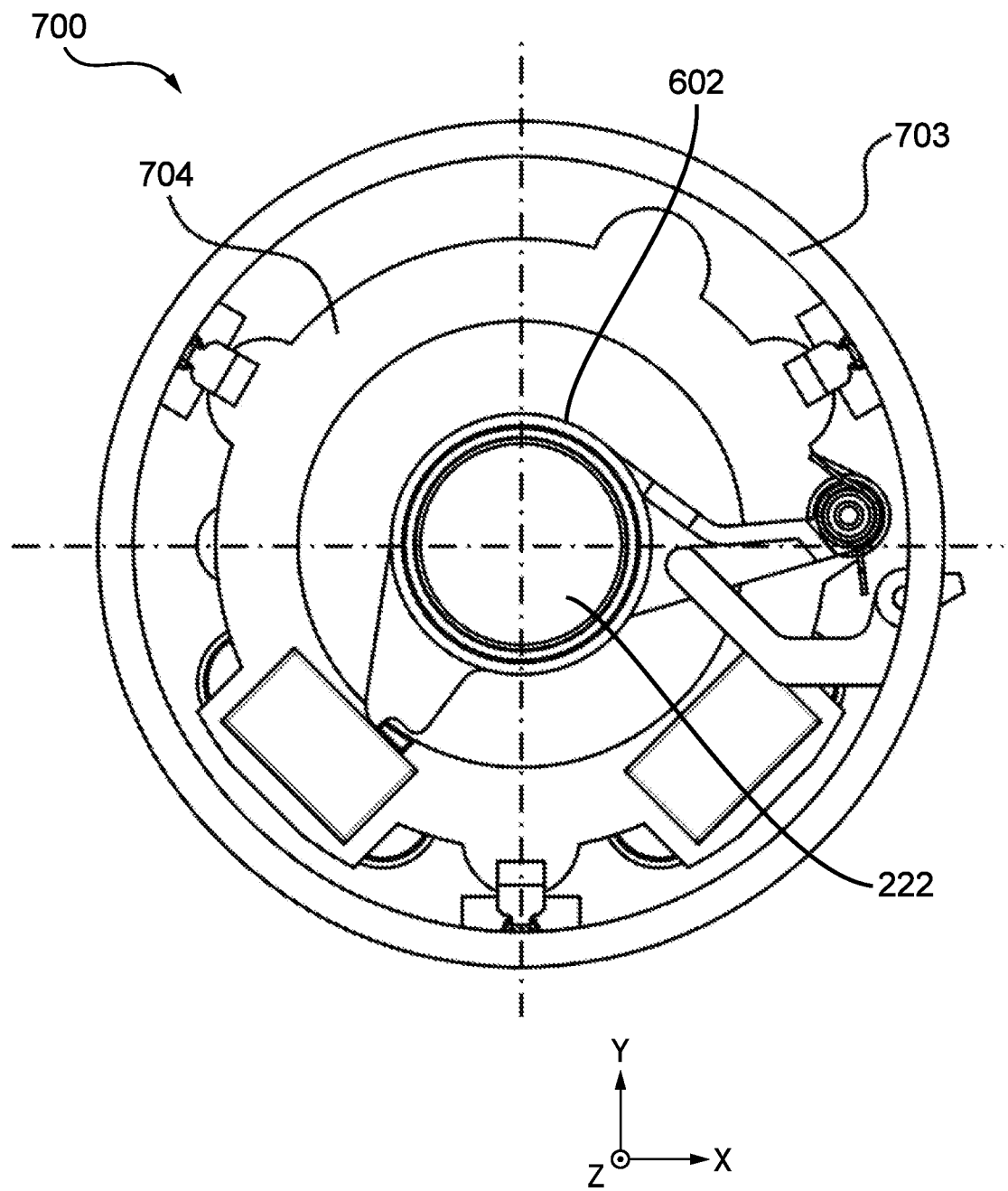
FIG. 24 is a front view showing an image-pickup state of the image stabilization device in the third embodiment.
Figure 25:
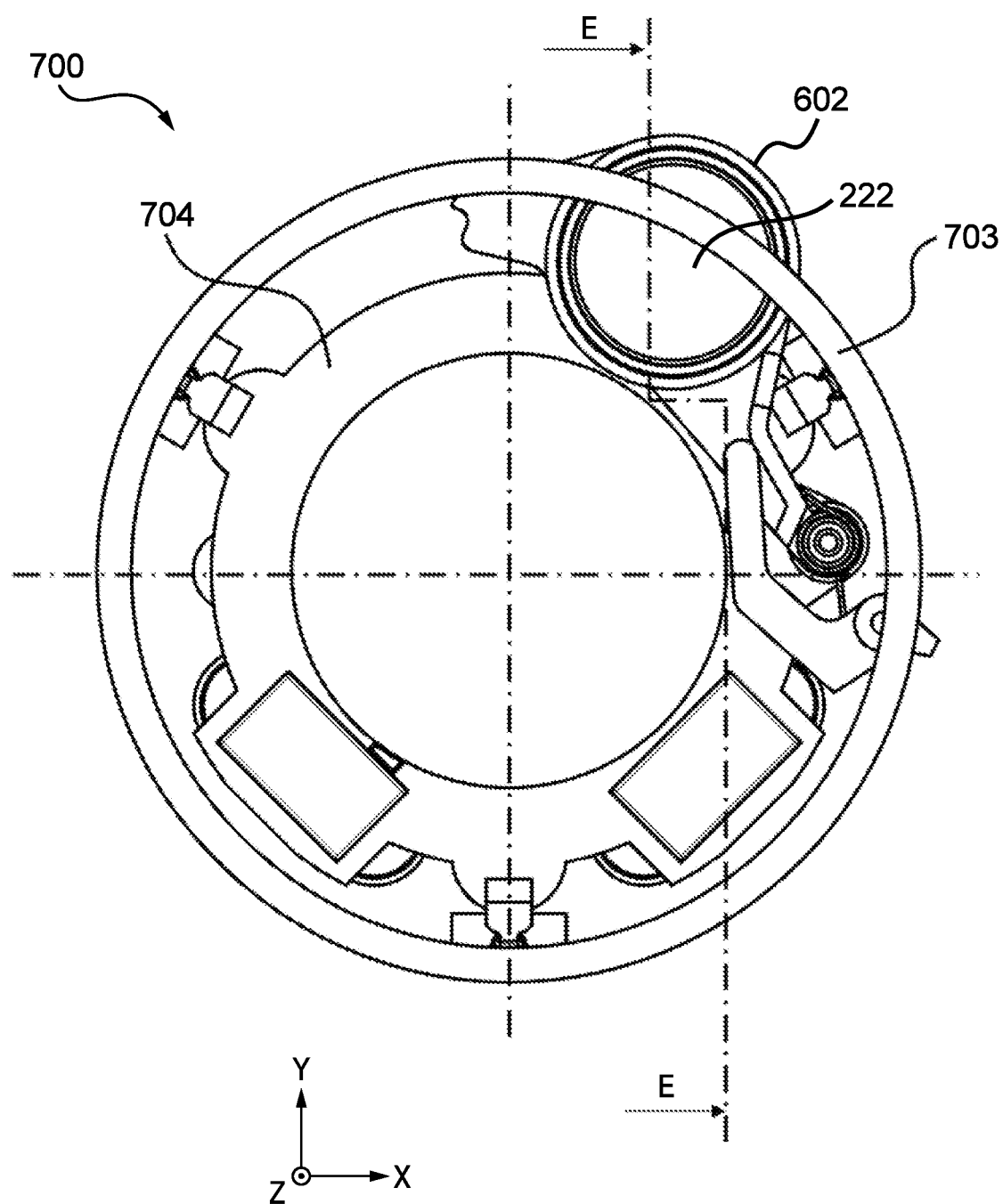
FIG. 25 is a front view showing a non-image-pickup state of the image stabilization device according to the third embodiment.
Figure 26:
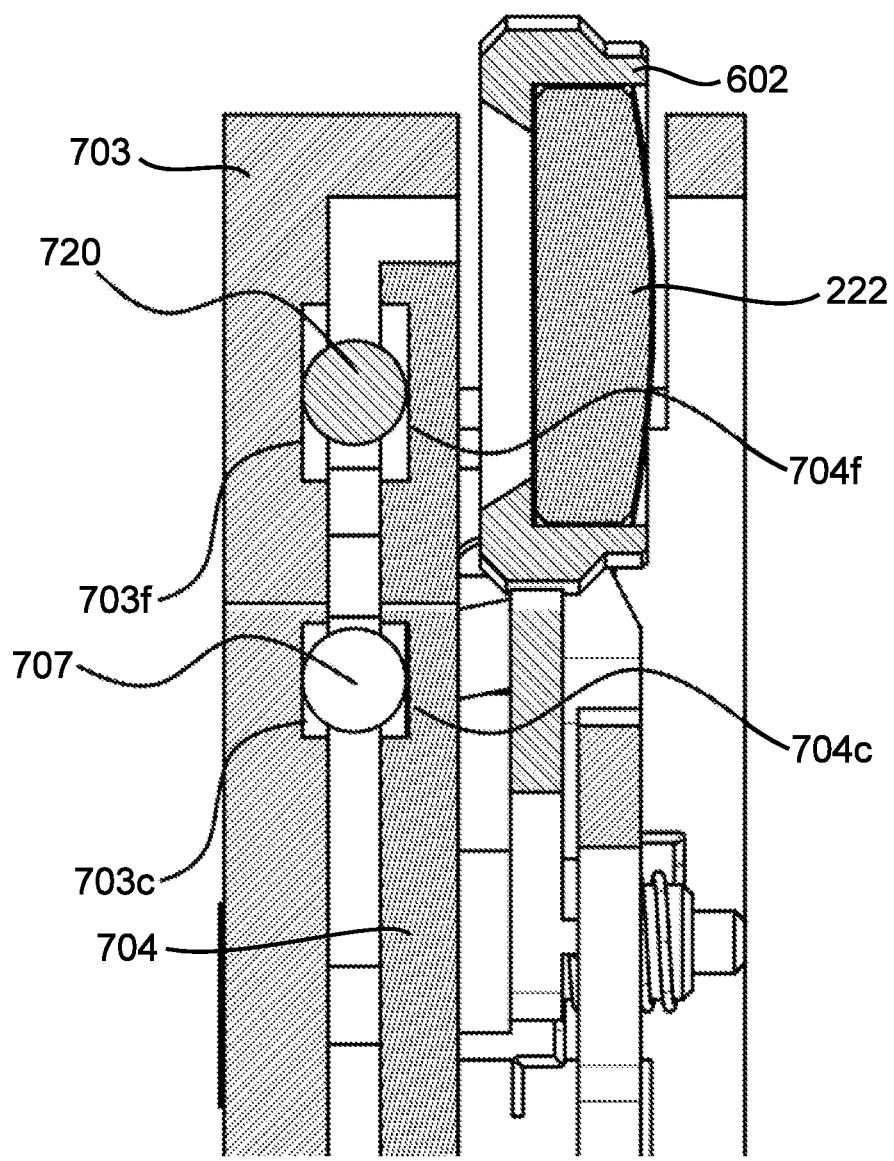
FIG. 26 is a sectional view showing the image stabilization device taken along a line E-E shown in FIG. 25.

Next, a third embodiment will be described. In the third embodiment, an image stabilization device of which a configuration differs from the image stabilization device 600 described in the second embodiment will be described. FIG. 23 is an exploded perspective view viewed from a front side showing an image stabilization device 700 according to the third embodiment. FIG. 24 is a front view showing the image stabilization device 700 in the state where the shift lens 222 is in the image pickup position. FIG. 25 is a front view showing the image stabilization device 700 in the state where the shift lens 222 is in the retreat position. FIG. 26 is a sectional view showing the image stabilization device 700 taken along a line C-C shown in FIG. 25.

The image stabilization device 700 has the shift lens 222, a lens frame 602, a base member 703, a shift member 704, the torsion spring 605, the retreat lever 606, three balls 707 (rolling members), and the three springs 608. Since the shift, lens 222, lens frame 602, torsion spring 605, retreating lever 606, pair of magnets 609, and pair of coils 610 are identical to the members that constitute the image stabilization device 600 according to the second embodiment, their descriptions are omitted. Moreover, spring hooks 703b and 704b are respectively equivalent to the spring hooks 603b and 604b of the image stabilization device 600.

The image stabilization device 700 is different from the image stabilization device 600 described in the second embodiment in that a rolling support member 720 is arranged near the retreat position of the shift lens 222. Hereinafter, this point will be mainly described.

In the state where the shift lens 222 is in the retreat position, a centroid balance among the three balls 707 is collapsed. Accordingly, when an external force, such as an impact, is received, dents may occur in a ball 707 and its ball receiving surfaces 703c and 704c nearest to the retreat position of the shift lens 222. In order to solve this issue, the rolling support member 720 is arranged near the retreat position of the shift lens 222. The rolling support member 720 is a ball (sphere) arranged between a supporting-ball receiving surface 703f provided in the base member 703 and a supporting-ball receiving surface 704f provided in the shift member 704.

The rolling support member 720 may be nipped between the support-ball receiving surfaces 703f and 704f in a contact state. Alternatively, there may be a minute gap between the rolling support member 720 and the supporting-ball receiving surfaces 703f and 704f. That is, the distance between the supporting-ball receiving surfaces 703f and 704f in the optical axis direction may be longer than the distance between the ball receiving surfaces 703c and 704c. This is because it is preferable to determine a plane by the three balls 707 in the image pickup state. When the state where the shift lens 222 is in the retreat position is viewed in the optical axis direction, a part of the shift lens 222 is more distant from the optical axis than the rolling support member 720.

When an external force, such as an impact, is received in the state where the shift lens 222 is in the retreat position, the rolling support member 720 and the supporting-ball receiving surfaces 703f and 704f receive the external force because the rolling support member 720 is arranged. As a result, the external force acting on the balls 707 and the ball receiving surfaces 703c and 704c is reduced, which reduces a risk of a damage such as dents occurring in the balls 707 and the ball receiving surfaces 703c and 704c. As the result, degradation of the rolling performance of the balls 707 is reduced and degradation of the image stabilization performance is reduced.

It should be noted that the supporting-ball receiving surface 703f may be formed from different material from the base member 703 using well-known techniques, such as insert molding and adhesion. The supporting-ball receiving surface 704f may be also formed from different material from the shift member 704. In this case, when the supporting-ball receiving surfaces 703f and 704f are formed from high hardness material (for example, metal, ceramics, etc.) that is harder than the material of the ball receiving surfaces 703c and 704c, the damage risk of the balls 707 and the ball receiving surfaces 703c and 704c can be further reduced.

In the third embodiment, as mentioned above, even when the image stabilization device receives an external force, such as an impact, in the state where the shift lens 222 is in the retreat position, the risk of a damage such as dents occurring in the balls 707 and the ball receiving surfaces 703c and 704c can be reduced as with the second embodiment.

Next, a fourth embodiment will be described.

Figure 27:
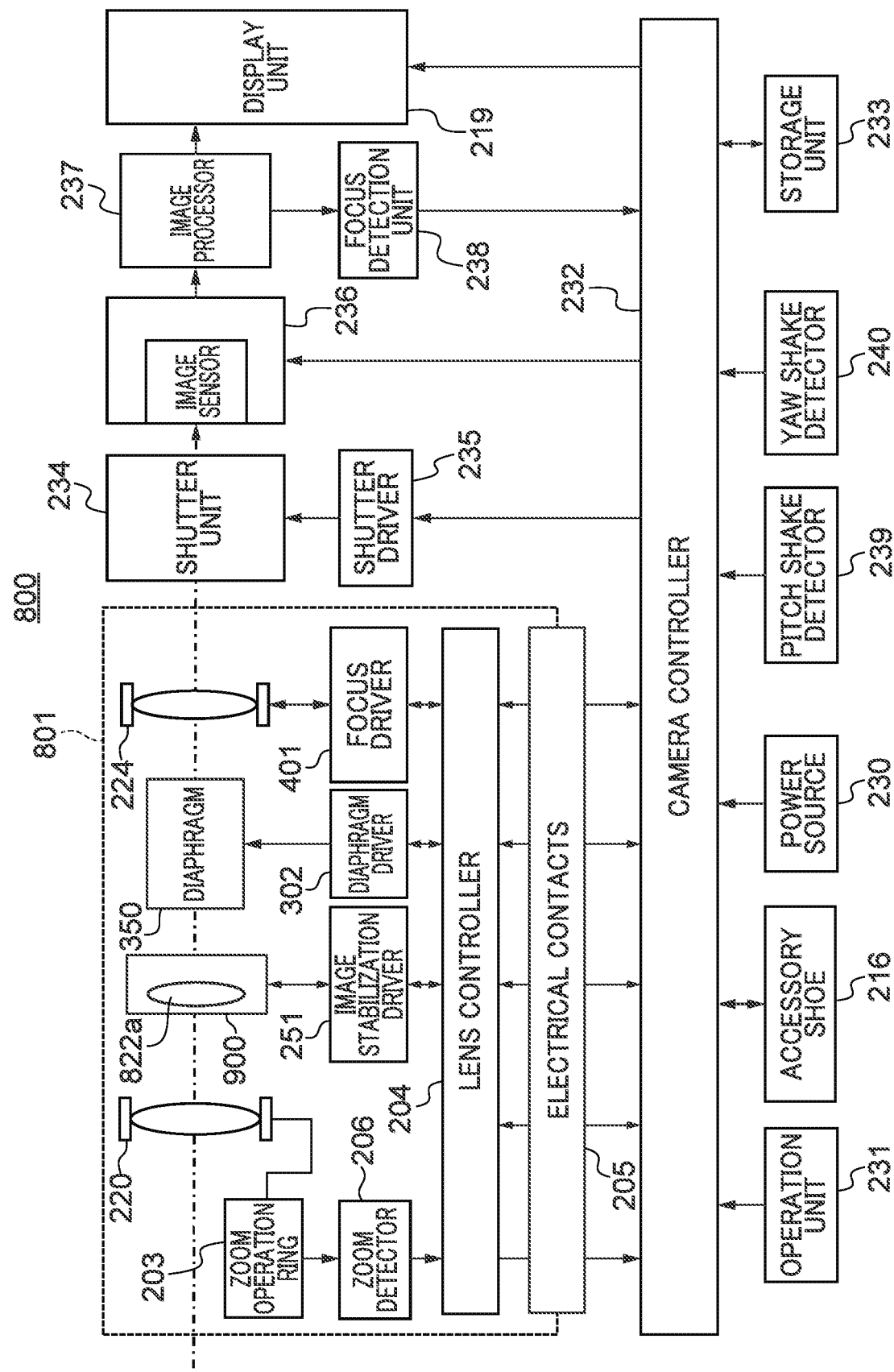
FIG. 27 is a block diagram schematically showing a configuration of a digital camera according to a fourth embodiment.

FIG. 27 is a block diagram showing an electric configuration and an optical configuration of a digital camera 800 according to the fourth embodiment. Since the external appearance of the digital camera 800 is approximately identical to the external appearance of the digital camera 200 (see FIG. 13A and FIG. 13B) according to the second embodiment, an illustration of the external appearance is omitted. Moreover, the digital camera 800 is different from the digital camera 200 equipped with the lens barrel 201 in the second embodiment in that a lens barrel 801 is provided. Moreover, the lens barrel 801 has characteristic features in an image stabilization device 900 and a diaphragm unit 350 as compared with the lens barrel 201 in the second embodiment. Moreover, a shift lens 822a is used in place of the shift, lens 222 in the second embodiment. The other components are equivalent to the lens barrel 201. Accordingly, hereinafter, the components of the digital camera 800 that are approximately identical to the components of the digital camera 200 are indicated by the same reference numerals and their descriptions are omitted. The image stabilization device 900 and the diaphragm unit 350 are mainly described.

Figure 28:
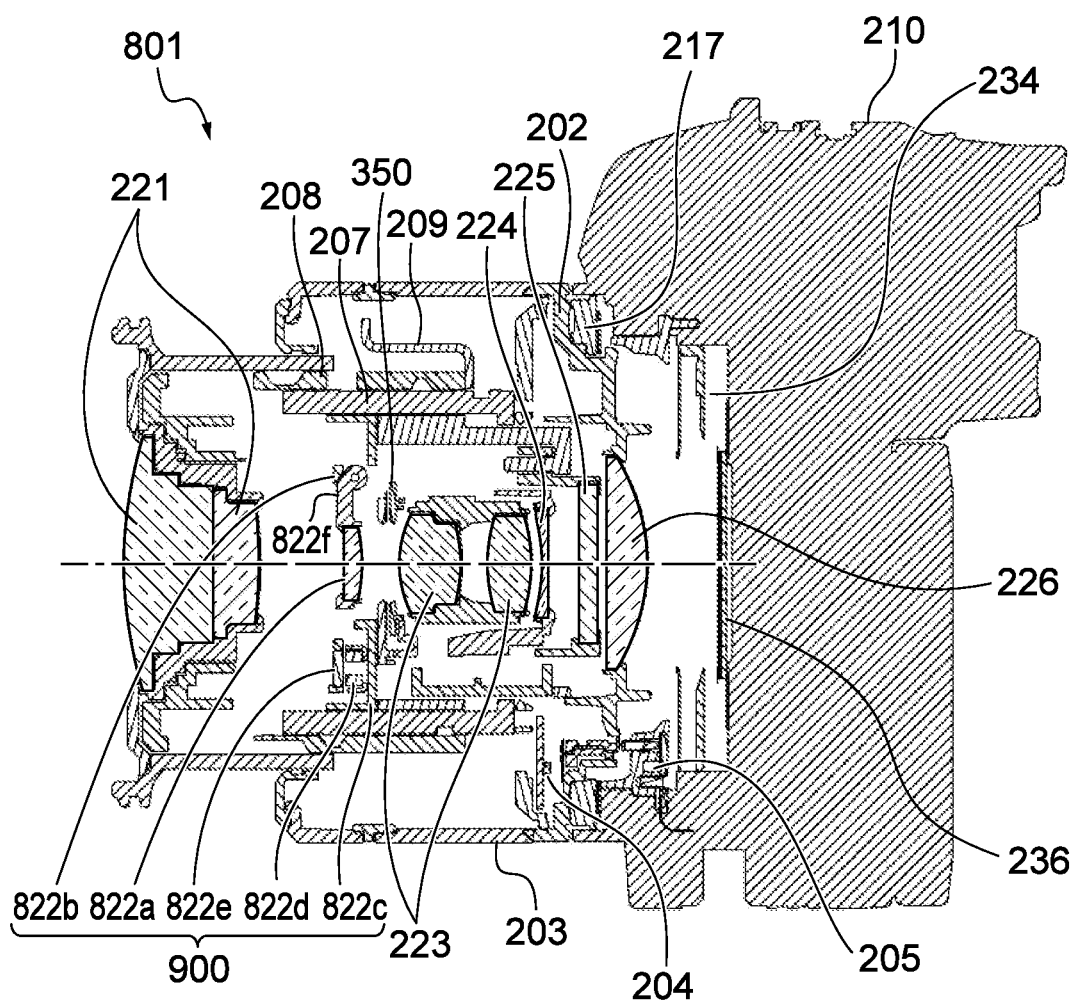
FIG. 28 is a sectional view showing a state of a wide angle end of the lens barrel in the fourth embodiment.
Figure 28:
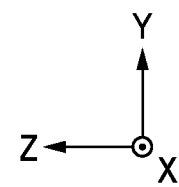
Figure 29:
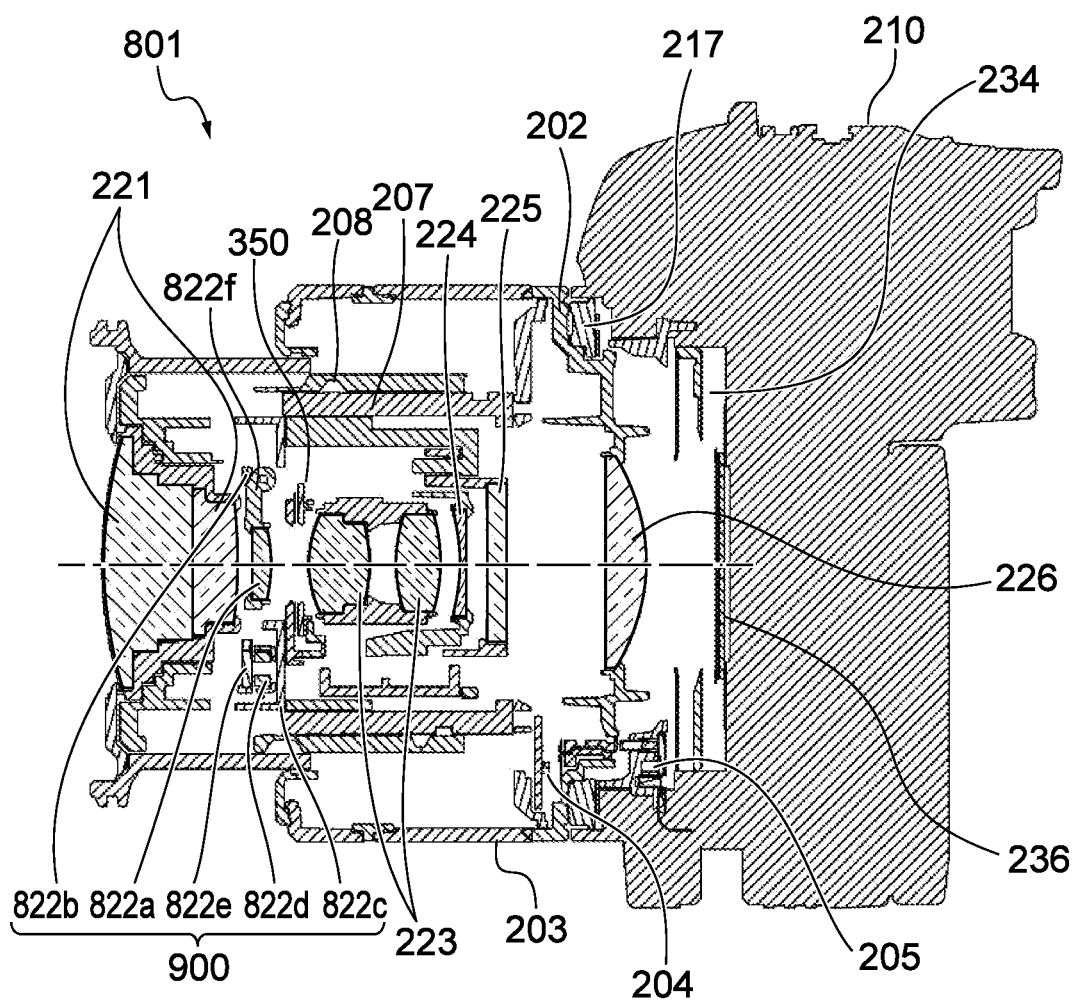
FIG. 29 is a sectional view showing a state of a telephoto end of the lens barrel in the fourth embodiment.
Figure 30:
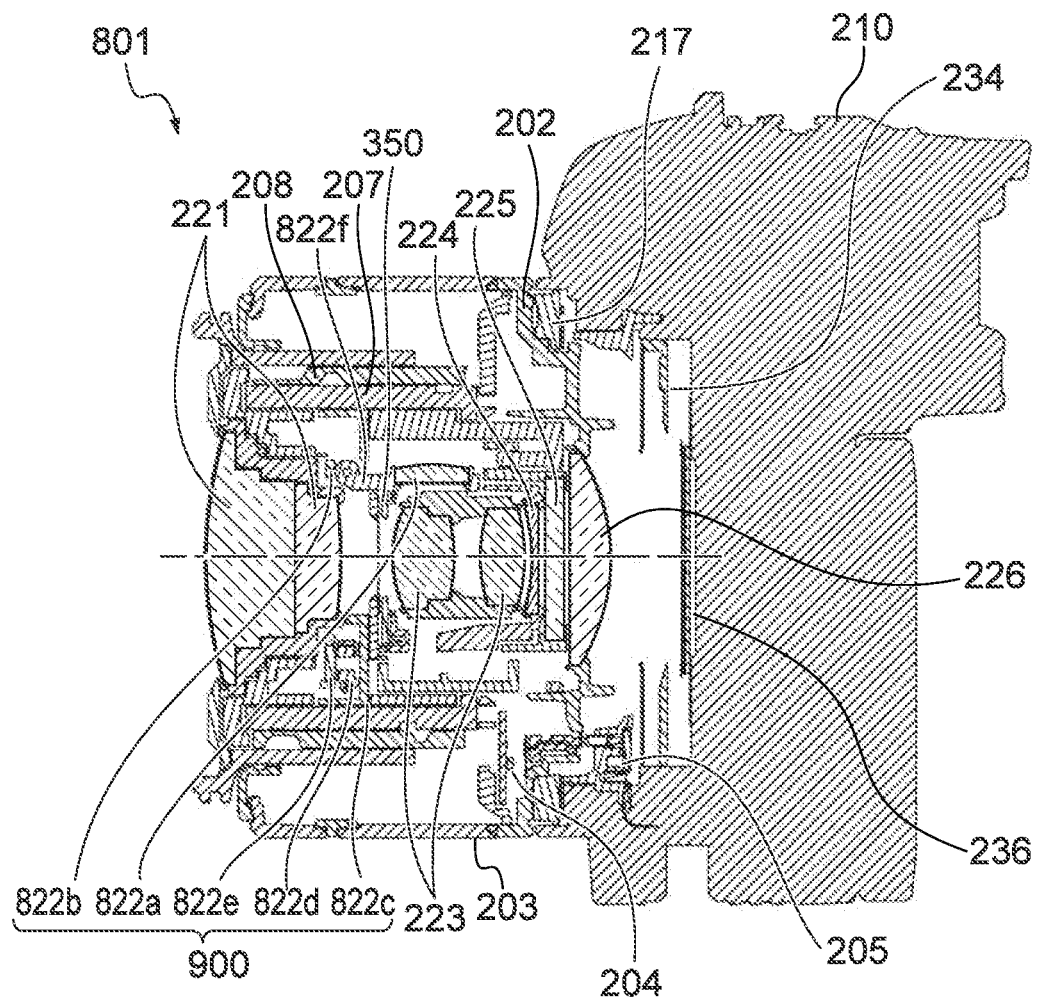
FIG. 30 is a sectional view showing a retracted state of the lens barrel in the fourth embodiment.

FIG. 28 through FIG. 30 are YZ sectional views (sectional views that intersect perpendicularly with the X-axis) showing the digital camera 800, and are shown by the sections including the optical axis. FIG. 28 shows a state where the lens barrel 801 is set to a wide angle end at a short focal length side. FIG. 29 shows a state where the lens barrel 801 is set to a telephoto end at a long focal length side. FIG. 30 shows the retracted state in which the overall length of the lens barrel 801 becomes the shortest.

When the digital camera 800 is in a state enabling the image pickup operation as shown in FIG. 28 and FIG. 29, all lens groups 211, 822a, 223 through 226 are arranged on the optical axis that intersects perpendicularly with the image pickup surface of the image sensor 236. Then, when the zoom operation ring 103 is rotationally operated to a retraction end from the state shown in FIG. 28, the first, third, fourth, and fifth lens groups 221, 223, 224, and 225 start retraction to the back side (side of the camera body 210), and simultaneously the shift lens 822a retreats from the optical axis. When the first lens group 221 is moved into a space generated by the retreat of the shift lens 822a and is stored without mutual interference, the lens barrel 801 reaches the state shown in FIG. 30 where the overall length is the shortest. A key 209 that connects the zoom operation ring 103 with the cam barrel 108 is shown in FIG. 28. The key 209 is not shown in the second embodiment (FIG. 14 through FIG. 16).

The image stabilization device 900 includes the shift lens 822a as the image stabilization element. The shift lens 822a functions as the second lens group. Then, the image stabilization device 900 plays a role that reduces an image shake by shifting the shift lens 822a in the plane that intersects perpendicularly with the optical axis. In the description of the fourth embodiment, the state where the shift lens 822a is in the image pickup position on the optical axis is expressed as "the image stabilization device is in an image pickup state". Moreover, the state where the shift lens 822a retreats from the optical axis to the retreat position is expressed as "the image stabilization device is in a non-image-pickup state".

The image stabilization device 900 has the shift lens 822a, a lens frame 822f, a retreat base plate 822b, an image stabilization base plate 822c, a plurality of coils 822d, and a plurality of magnets 822e. The shift lens 822e can be moved in arbitrary directions in a plane that intersects perpendicularly with the optical axis by Lorentz forces generated between the coils 822d and the magnets 822e by supplying an electric current to the coils 822d.

The image stabilization device 600 of the second embodiment is configured to move the shift lens 222 to the retreat position by rotating the lens frame 602 holding the shift lens 222 around the axis parallel to the optical axis (Z-axis). Against this, the image stabilization device 900 is configured to move the shift lens 822a to the retreat position by rotating the lens frame 822f holding the shift lens 822a around an axis parallel to the X-axis. Details will be described below.

Next, transitions of the image stabilization device 900 and the diaphragm unit 350 in the lens barrel 801 between the image pickup state and the non-image-pickup state will be described by referring to FIG. 31A through FIG. 35. FIG. 31A through FIG. 34B are sectional views showing the lens barrel 801 and perspective views showing the image stabilization device 900 and diaphragm unit 350 in steps when the lens barrel 801 is changed from the image pickup state to the non-image-pickup state. FIG. 35 is a timing chart showing position changes of the first lens group 221, the second lens group (shift lens) 822a, and the diaphragm unit 350 when the lens barrel 801 is changed from the image pickup state to the non-image-pickup state.

Figure 31A:
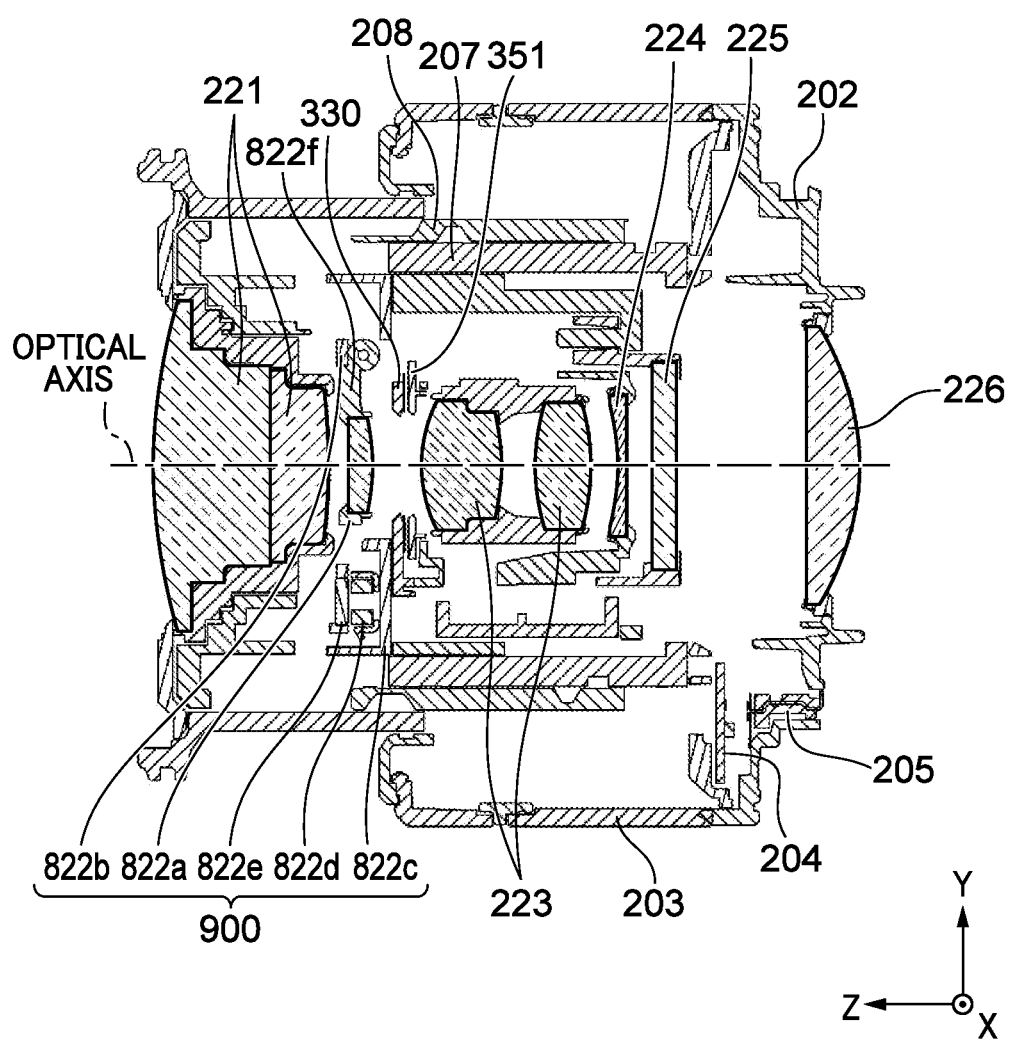
FIG. 31A and FIG. 31B are a sectional view and a perspective view showing an image-pickup state (state of the telephoto end) of the lens barrel in the fourth embodiment.
Figure 31B:
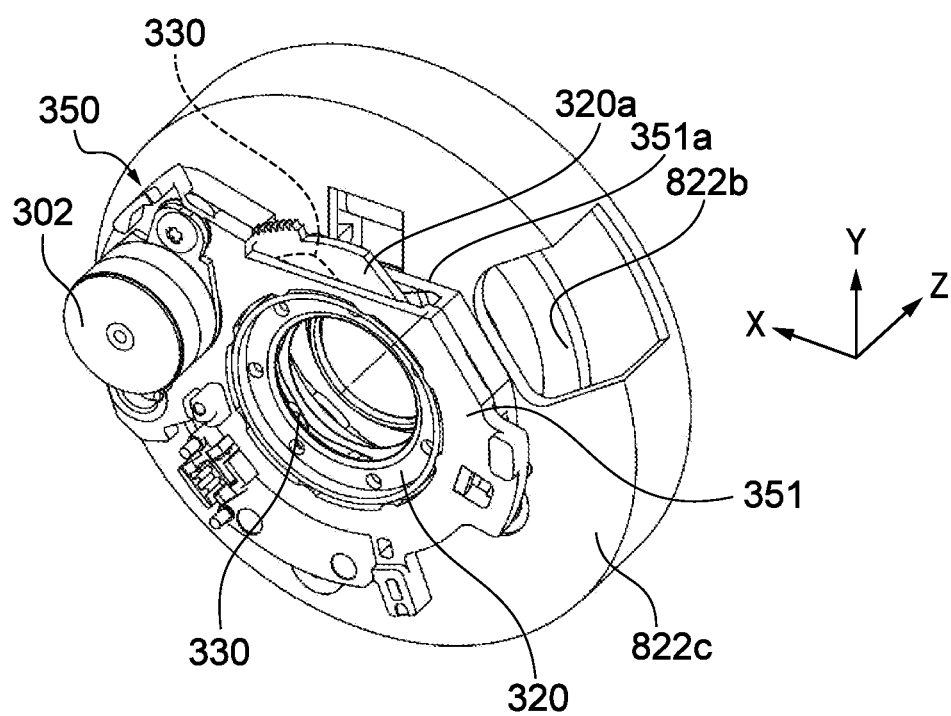

FIG. 31A is the sectional view showing the lens barrel 801 in the case the image stabilization device 900 is in the image pickup state. FIG. 31B is the perspective view showing the image stabilization device 900 and the diaphragm unit 350 corresponding to the state of FIG. 31A. The state of FIG. 31A and FIG. 319 corresponds to the image pickup state in a period between time points t0 and t1 in FIG. 35.

As shown in FIG. 31B, the diaphragm unit 350 has a diaphragm unit frame 351, the diaphragm driver 302, a drive ring 320, and a plurality of diaphragm blades 330. The diaphragm driver 302 is attached to the diaphragm unit frame 351, and the drive ring 320 and the diaphragm blades 330 are supported by the diaphragm unit frame 351 movable. When the diaphragm driver 302 is driven, the drive ring 320 is driven to drive the diaphragm blades 330 to form an intended aperture shape. As a result, an incident light amount to the image sensor 236 is adjusted. A notch section 351a is provided in the outermost periphery of the diaphragm unit frame 351 so as to cut a part of the outermost periphery.

When the image stabilization device 900 is in an image pickup state, the shift lens 822a is arranged on the optical axis like the other lens groups. Moreover, the diaphragm blades 330 are driven to an arbitrary aperture diameter by the diaphragm driver 302 and drive ring 320 so as to adjust the incident light amount to the image sensor 236. Furthermore, a shading part 320a that is a part of the drive ring 320 and a part of the diaphragm blades 330 are protruded from the notch section 351a and shade stray light. In FIG. 31B, the part of the diaphragm blades 330 protruded from the notch section 351a is shown by a broken line because it is in the +Z side of the shading part 320a.

Figure 32A:
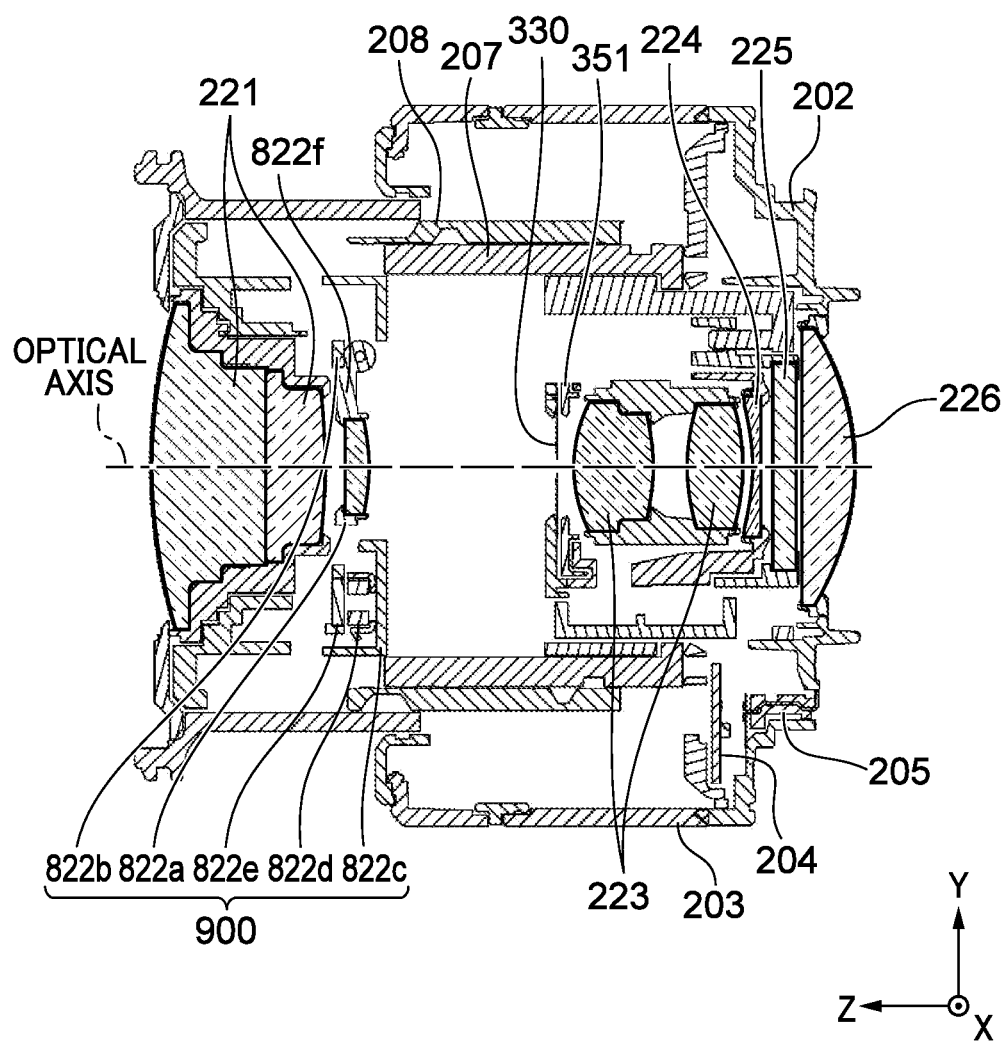
FIG. 32A and FIG. 32B are a sectional view and a perspective view showing a first stage of transition from the image-pickup state to a non-image-pickup state of the lens barrel in the fourth embodiment.
Figure 32B:
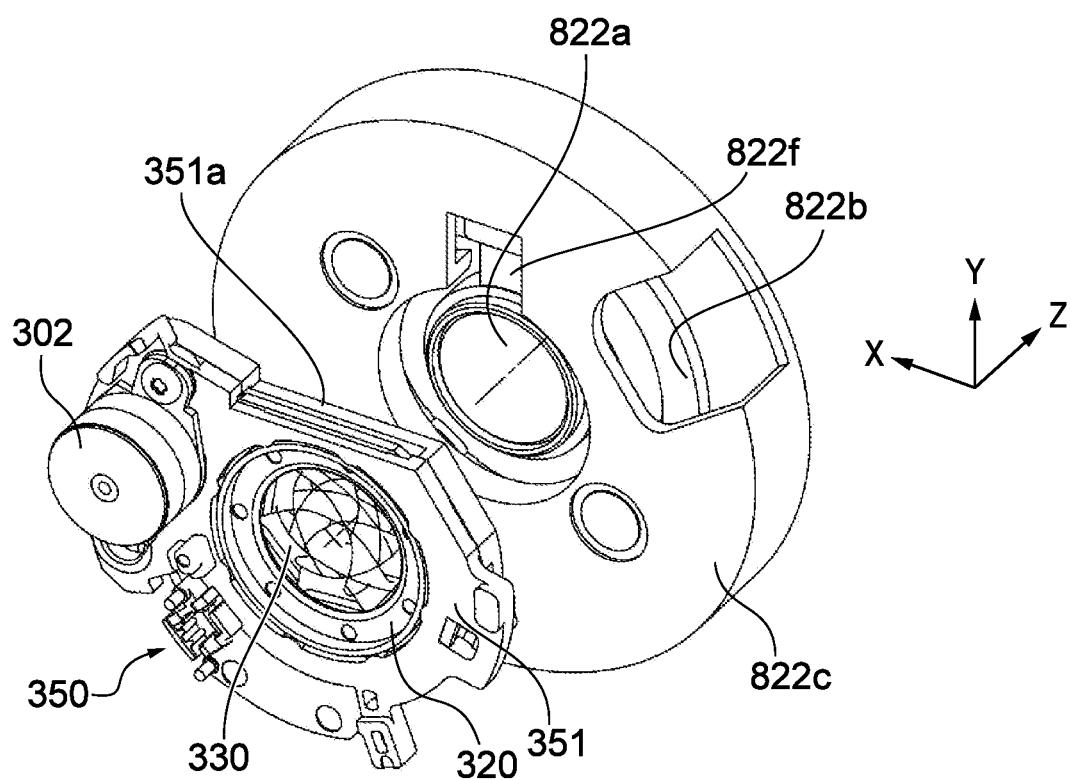

FIG. 32A is the sectional view showing a state where the zoom operation ring 103 is rotationally operated from the position of the wide angle end toward the position of the retraction end. FIG. 32A shows a first stage of the transition of the image stabilization device 900 from the image pickup state to the non-image-pickup state. FIG. 32B is the perspective view showing the image stabilization device 900 and the diaphragm unit 350 corresponding to the state of FIG. 32A. The state of FIG. 32A and FIG. 32B corresponds a state at a time point t2 in FIG. 35.

When the zoom operation ring 103 is rotationally operated toward the position of the retraction end from the position of the wide angle end, the diaphragm unit 350, the third lens group 223, the focus lens group 224, and the fifth lens group 225 are moved to the back side from the former positions due to the functions of the rectilinear guide barrel 107 and cam barrel 108. Thereby, the lens barrel 801 shifts to the non-image-pickup state.

When the diaphragm unit 350 is moved to the back side, the drive ring 320 is mechanically rotatably driven by the functions of other adjacent groups or the rectilinear guide barrel 107 and cam barrel 108, and the diaphragm blades 330 are driven to a small aperture state in which the aperture diameter is small. At this time, the shading part 320a of the drive ring 320 and the portion of the diaphragm blades 330 that were protruded from the notch section 351a are stored into the diaphragm unit frame 351.

When the zoom operation ring 103 is further rotationally operated towards the retraction end from the position of the first stage (FIG. 32A and FIG. 32B), the first lens group 221 is moved to the side of the shift lens 822a by the functions of the rectilinear guide barrel 107 and cam barrel 108. Since the third though fifth lens groups 223 through 225 are moved to the back side in that time, a space is generated at the back side of the shift lens 822a. Accordingly, the lens frame 822f of the image stabilization device 900 is rotated mechanically around the axis parallel to the X-axis using this space. Thereby, the shift lens 822a is moved to the retreat position that is separated from the optical axis by a predetermined distance in a +Y-direction side, and the image stabilization device 900 shifts to the non-image-pickup state.

Figure 33A:
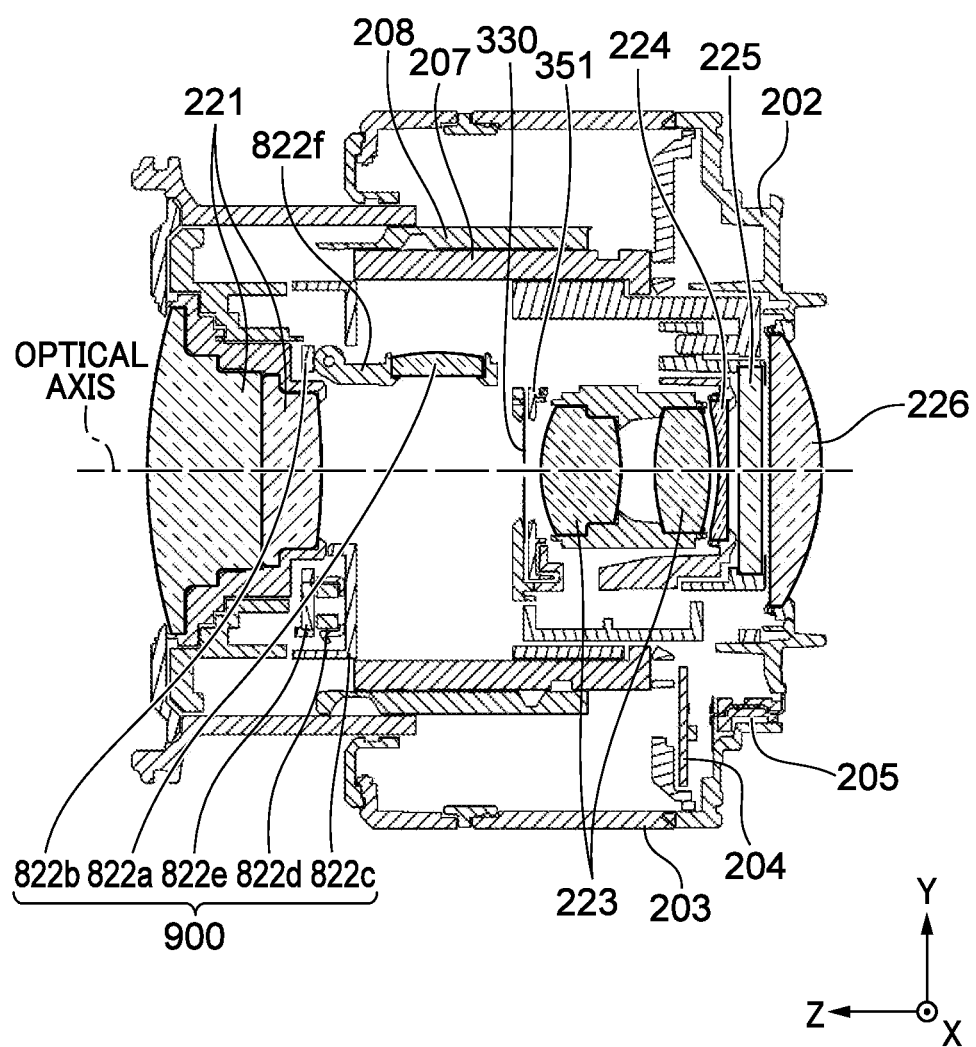
FIG. 33A and FIG. 33B are a sectional view and a perspective view showing a second stage of the transition from the image-pickup state to the non-image-pickup state of the lens barrel in the fourth embodiment.
Figure 33B:
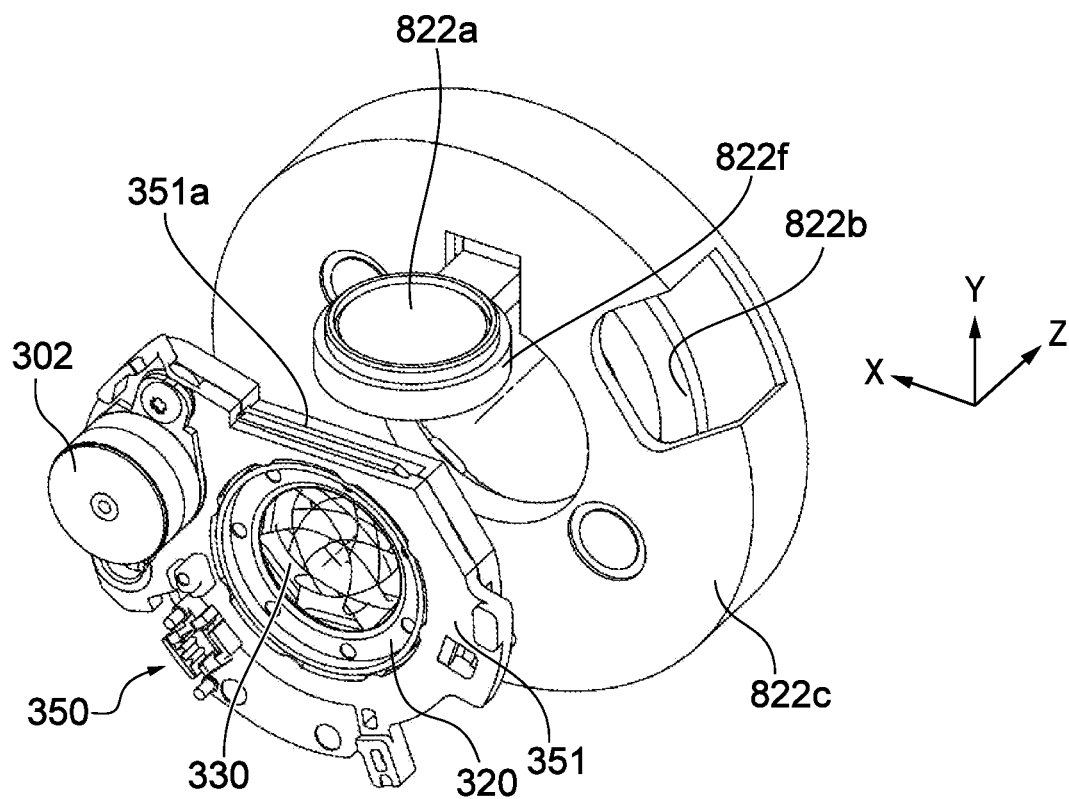

FIG. 33A is the sectional view showing a state where the zoom operation ring 103 is further rotationally operated from the first stage toward the position of the retraction end. FIG. 33A shows a second stage of the transition of the image stabilization device 900 from the image pickup state to the non-image-pickup state. In this stage, the shift lens 822a is moved to the retreat position and the first lens group 221 is moved to a space that was occupied by the shift lens 822a. FIG. 33B is the perspective view showing the image stabilization device 900 and the diaphragm unit 350 corresponding to the state of FIG. 33A. The state of FIG. 33A and FIG. 33B corresponds a state at a time point t3 in FIG. 35.

When the zoom operation ring 103 is further rotationally operated towards the retraction end from the position of the second stage (FIG. 33A and FIG. 33B), the first lens group 221 and the image stabilization device 900 that approach mutually are moved to the back side by the functions of the rectilinear guide barrel 107 and cam barrel 108 while maintaining the distance therebetween. At this time, the diaphragm unit 350 has already moved to the back side, and the shading part 320a of the drive ring 320 and the part of diaphragm blade 330 have been stored in the diaphragm unit frame 351. Accordingly, a part of the lens frame 822f (shift lens 822a) is inserted into the notch section 351a, and the image stabilization device 900 becomes the closest to the diaphragm unit 350 in the optical axis direction.

It should be noted that the transition to the non-image-pickup state of the third lens group 223 is already completed at the back side of the diaphragm unit 350. Accordingly, a part of the shift lens 822a is stored so as to overlap with the third lens group 223 in a plane that intersects perpendicularly with the optical axis (the part of the shift lens 822a overlaps with the third lens group when viewed from the +Y side).

Figure 34A:
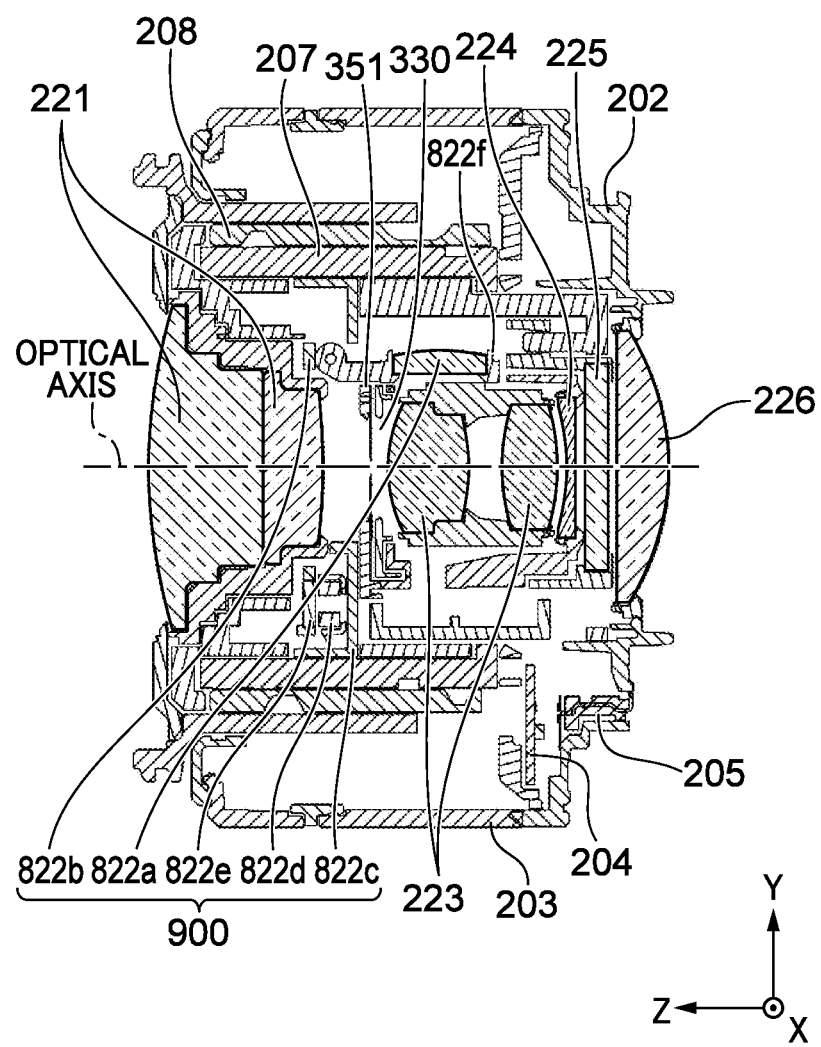
FIG. 34A and FIG. 34B are a sectional view and a perspective view showing the non-image-pickup state (retracted state) of the lens barrel in the fourth embodiment.
Figure 34B:
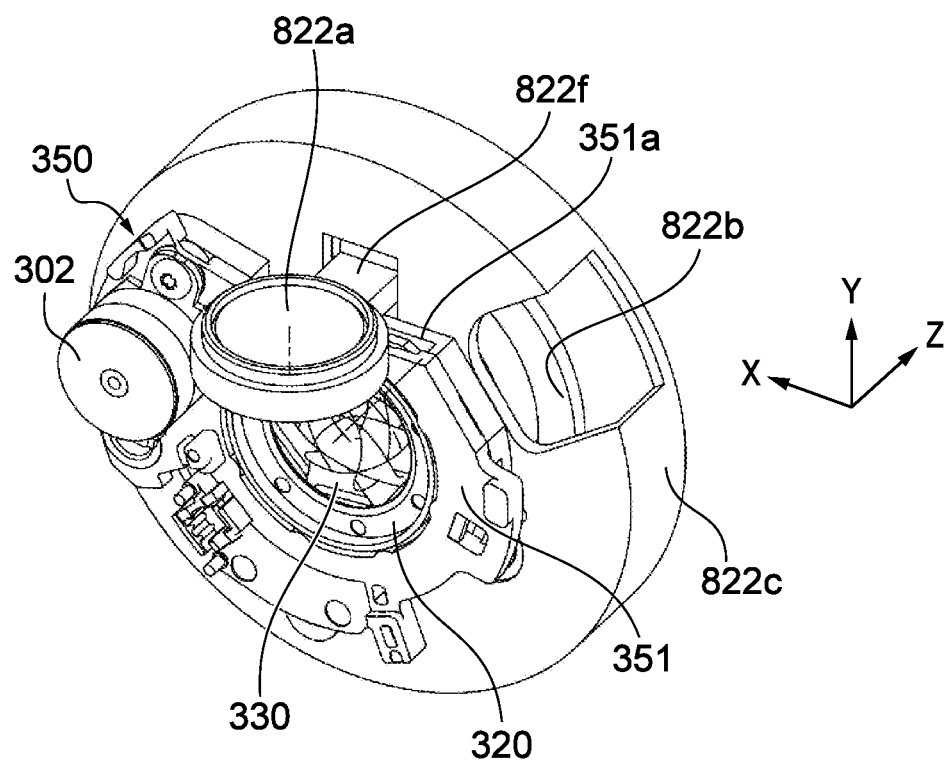

FIG. 34A is the sectional view showing a state where the zoom operation ring 103 is further rotationally operated toward the position of the retraction end from the secondary stage. FIG. 34A shows a state where the image stabilization device 900 shifts to the non-image-pickup state. FIG. 34B is the perspective view showing the image stabilization device 900 and the diaphragm unit 350 corresponding to the state of FIG. 34A. The state of 34A and FIG. 34B corresponds a state at a time point t4 in FIG. 35.

Since a transition operation of the lens barrel 801 from e non-image-pickup state to the image pickup state (from the time point t4 to the time point t1 in FIG. 35) is a reverse operation from the image pickup state to the non-image-pickup state, its description is omitted.

As mentioned above, in the fourth embodiment, since the diaphragm blades 330 are controlled to the small aperture in the non-image-pickup state, the incident light amount to the image sensor 236 is reduced, which avoids burning of the image sensor 236. Moreover, in the non-image-pickup state, the shift lens 822a constituting the image stabilization device 900 is moved to the retreat position outside the optical axis and the part of the lens frame 822f is inserted into the notch section 351a of the diaphragm unit frame 351. Thereby, the overall length of the lens barrel 108 in the retracted state can be shortened without enlarging the outside diameter of the lens barrel 801.

In the fourth embodiment, the overall length of the lens barrel 801 is shortened in the non-image-pickup state by inserting the part of the lens frame 822f holding the shift lens 822a of the image stabilization device 900 adjacent to the diaphragm unit 350 into the notch section 351a provided in the diaphragm unit 350. However, a member to be inserted into the notch section 351a is not limited to the lens holder 822f holding the shift lens 822a as long as the overall length of the lens barrel 801 can be shortened. For example, the actuator (a stepping motor, a vibration actuator (ultrasonic motor), etc.) that is a drive source of the focus lens group 224 or a guide bar that linearly guides the focus lens group 224 may be inserted into the notch section 351a. Moreover, the operation that controls the diaphragm blades 330 to the small aperture state in the non-image-pickup state is applicable also to the configuration that rotates the lens frame 602 around the axis parallel to the optical axis like the lens barrel 201 in the second embodiment. This reduces burning of the image sensor 236 of the camera body 210 to which the lens barrel 201 is attached.

Although the present invention has been described in detail on the basis of the suitable embodiments, the present invention is not limited to these specific embodiments, and various configurations that do not deviate from the scope of the present invention are also included in the present invention. Furthermore, each embodiment mentioned above shows one embodiment of the present invention, and the embodiments can be combined suitably.

Although the optical apparatus of the present invention is described as the lens barrel of the image pickup apparatus, the optical apparatus of the present invention is not limited to this. For example, the present invention is applicable to observation apparatuses, such as a binocular, a telescope, and a field scope.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135594, filed Aug. 23, 2021, which is hereby incorporated by reference herein in its entirety.

What is claimed is:

1. An optical apparatus comprising:
lens groups that are arranged on an optical axis to be movable along the optical axis;
a first shaft that is arranged in parallel to the optical axis and that has a fitting part fit in a predetermined lens group among the lens groups and a first fixing part;
a support member that rotatably supports the first shaft by holding the first fixing part, and
a second shaft that is provided in the support member in parallel to the optical axis and that has a second fixing part held by the support member and a contact part that contacts the predetermined lens group to regulate a position of the predetermined lens group in a direction of the optical axis,
wherein a center axis of the first fixing part and a center axis of the fitting part are eccentric,
wherein the first shaft is supported by the support member to be rotatable around the center axis of the first fixing part,
wherein a center axis of the second fixing part and a center axis of the contact part are eccentric, and an eccentricity amount of the second shaft is more than a half of an eccentricity amount of the first shaft,
wherein the second shaft is supported by the support member to be rotatable around the center axis of the second fixing part, and
wherein the predetermined lens group is movable between an image pickup position on the optical axis and a retreat position that is separated from the optical axis by rotating around the first shaft.

2. The optical apparatus according to claim 1, wherein when a straight line that connects a center of the first shaft and a center of the second shaft in a plane that intersects perpendicularly with the optical axis is divided by a normal line that passes a center of the predetermined lens and is perpendicular to the straight line, a length between the center of the firs shaft and the normal line along the straight line is longer than a distance between the center of the second shaft and the normal line along the straight line.

3. The optical apparatus according to claim 1, wherein the first shaft has a first adjustment part that is rotationally operated from outside to move a center of the predetermined lens with respect to the optical axis.

4. The optical apparatus according to claim 3, wherein the second shaft has a second adjustment part that is rotationally operated from outside to move the center axis of the predetermined lens with respect to the optical axis.

5. The optical apparatus according to claim 4, wherein the second fixing part is provided between the contact part and the second adjustment part.

6. The optical apparatus according to claim 4, wherein the first adjustment part and the second adjustment part are provided in a same direction in a direction of the optical axis.

7. An image stabilization apparatus comprising:
an optical apparatus comprising:
lens groups that are arranged on an optical axis to be movable along the optical axis;
a first shaft that is arranged in parallel to the optical axis and that has a fitting part fit in a predetermined lens group among the lens groups and a first fixing part;
a support member that rotatably supports the first shaft by holding the first fixing part;
a second shaft that is provided in the support member in parallel to the optical axis and that has a second fixing part held by the support member and a contact part that contacts the predetermined lens group to regulate a position of the predetermined lens group in a direction of the optical axis, and
a drive unit configured to move the predetermined lens group in a plane that intersects perpendicularly with the optical axis in the state where the predetermined lens group is in the image pickup position on the optical axis,
wherein a center axis of the first fixing part and a center axis of the fitting part are eccentric,
wherein the first shaft is supported by the support member to be rotatable around the center axis of the first fixing part,
wherein a center axis of the second fixing part and a center axis of the contact part are eccentric, and an eccentricity amount of the second shaft is more than a half of an eccentricity amount of the first shaft,
wherein the second shaft is supported by the support member to be rotatable around the center axis of the second fixing part, and
wherein the predetermined lens group is movable between an image pickup position on the optical axis and a retreat position that is separated from the optical axis by rotating around the first shaft.

8. A lens barrel comprising:
an optical apparatus comprising:
lens groups that are arranged on an optical axis to be movable along the optical axis;
a first shaft that is arranged in parallel to the optical axis and that has a fitting part fit in a predetermined lens group among the lens groups and a first fixing part;
a support member that rotatably supports the first shaft by holding the first fixing part, and
a second shaft that is provided in the support member in parallel to the optical axis and that has a second fixing part held by the support member and a contact part that contacts the predetermined lens group to regulate a position of the predetermined lens group in a direction of the optical axis,
wherein a center axis of the first fixing part and a center axis of the fitting part are eccentric,
wherein the first shaft is supported by the support member to be rotatable around the center axis of the first fixing part,
wherein a center axis of the second fixing part and a center axis of the contact part are eccentric, and an eccentricity amount of the second shaft is more than a half of an eccentricity amount of the first shaft,
wherein the second shaft is supported by the support member to be rotatable around the center axis of the second fixing part, wherein the predetermined lens group is movable between an image pickup position on the optical axis and a retreat position that is separated from the optical axis by rotating around the first shaft, and wherein the lens groups take in incident light and form an image at a predetermined position on the optical axis.

9. An image pickup apparatus comprising:

an optical apparatus comprising:
  lens groups that are arranged on an optical axis to be movable along the optical axis;
  a first shaft that is arranged in parallel to the optical axis and that has a fitting part fit in a predetermined lens group among the lens groups and a first fixing part;
  a support member that rotatably supports the first shaft by holding the first fixing part; and
  a second shaft that is provided in the support member in parallel to the optical axis and that has a second fixing part held by the support member and a contact part that contacts the predetermined lens group to regulate a position of the predetermined lens group in a direction of the optical axis; and an image sensor;

wherein a center axis of the first fixing part and a center axis of the fitting part are eccentric, wherein the first shaft is supported by the support member to be rotatable around the center axis of the first fixing part, wherein a center axis of the second fixing part and a center axis of the contact part are eccentric, and an eccentricity amount of the second shaft is more than a half of an eccentricity amount of the first shaft, wherein the second shaft is supported by the support member to be rotatable around the center axis of the second fixing part, wherein the predetermined lens group is movable between an image pickup position on the optical axis and a retreat position that is separated from the optical axis by rotating around the first shaft, and wherein the optical apparatus takes in incident light and forms an image on the image sensor.

* * * * *